(12) United States Patent
Zhang et al.

(10) Patent No.: US 10,810,707 B2
(45) Date of Patent: Oct. 20, 2020

(54) DEPTH-OF-FIELD BLUR EFFECTS GENERATING TECHNIQUES

(71) Applicant: Adobe Inc., San Jose, CA (US)

(72) Inventors: Jianming Zhang, Campbell, CA (US); Zhe Lin, Fremont, CA (US); Xiaohui Shen, San Jose, CA (US); Oliver Wang, Seattle, WA (US); Lijun Wang, Dalian (CN)

(73) Assignee: Adobe Inc., San Jose, CA (US)

( * ) Notice: Subject to any disclaimer, the term of this patent is extended or adjusted under 35 U.S.C. 154(b) by 79 days.

(21) Appl. No.: 16/204,675

(22) Filed: Nov. 29, 2018

(65) Prior Publication Data

US 2020/0175651 A1 Jun. 4, 2020

(51) Int. Cl.
*G06T 5/00* (2006.01)
*G06T 5/20* (2006.01)

(52) U.S. Cl.
CPC ............... *G06T 5/002* (2013.01); *G06T 5/20* (2013.01); *G06T 2207/20081* (2013.01); *G06T 2207/20084* (2013.01)

(58) Field of Classification Search
CPC . G06T 5/002; G06T 5/20; G06T 2207/20081; G06T 2207/20084
See application file for complete search history.

(56) References Cited

U.S. PATENT DOCUMENTS

| 8,335,390 | B2* | 12/2012 | Li | G06T 5/002 |
| | | | | 382/255 |
| 9,185,387 | B2* | 11/2015 | Campbell | G06T 5/002 |
| 9,734,551 | B1* | 8/2017 | Esteban | H04N 1/387 |
| 2018/0350043 | A1* | 12/2018 | Seely | G06T 5/002 |

OTHER PUBLICATIONS

Barron,"Fast Bilateral-Space Stereo for Synthetic Defocus", Proceedings of the IEEE Conference on Computer Vision and Pattern Recognition, Jun. 2015, 9 pages.
Cheng,"Global Contrast based Salient Region Detection", IEEE Transactions on Pattern Analysis and Machine Intelligence, Mar. 2015, 14 pages.
Cook,"Distributed Ray Tracing", In ACM SIGGRAPH Computer Graphics, vol. 18, No. 3, Jul. 1984, pp. 137-145.
Deng,"ImageNet: A Large-Scale Hierarchical Image Database", In Proceedings of IEEE Conference on Computer Vision and Pattern Recognition, Jun. 20, 2009, 8 pages.

(Continued)

*Primary Examiner* — Brenda C Bernardi
(74) *Attorney, Agent, or Firm* — SBMC

(57) ABSTRACT

Techniques of generating depth-of-field blur effects on digital images by digital effect generation system of a computing device are described. The digital effect generation system is configured to generate depth-of-field blur effects on objects based on focal depth value that defines a depth plane in the digital image and a aperture value that defines an intensity of blur effect applied to the digital image. The digital effect generation system is also configured to improve the accuracy with which depth-of-field blur effects are generated by performing up-sampling operations and implementing a unique focal loss algorithm that minimizes the focal loss within digital images effectively.

20 Claims, 22 Drawing Sheets
(14 of 22 Drawing Sheet(s) Filed in Color)

(56) References Cited

OTHER PUBLICATIONS

Eigen,"Depth Map Prediction from a Single Image using a Multi-Scale Deep Network", Advances in neural information processing systems, 2014., Jun. 9, 2014, 9 pages.
Geiger,"Are we ready for Autonomous Driving? The KITTI Vision Benchmark Suite", Conference on Computer Vision and Pattern Recognition (CVPR), 2012., Jun. 2012, 8 pages.
Ha,"High-quality Depth from Uncalibrated Small Motion Clip", In Proceedings of the IEEE Conference on Computer Vision and Pattern Recognition., Jun. 2016, pp. 5413-5421.
Haeberli,"The Accumulation Buffer: Hardware Support for High-Quality Rendering", ACM SIGGRAPH Computer Graphics, vol. 24, No. 4, Aug. 1990, pp. 309-318.
He,"Deep Residual Learning for Image Recognition", Proceedings of the IEEE conference on computer vision and pattern recognition, 2016., Dec. 10, 2015, 12 pages.
He,"Guided Image Filtering", In European conference on computer vision. Springer, Sep. 2010, 14 pages.
Isola,"Image-to-Image Translation with Conditional Adversarial Networks", 2017 IEEE Conference on Computer Vision and Pattern Recognition (CVPR), Nov. 22, 2017, 17 pages.
Joshi,"Micro-Baseline Stereo", May 22, 2014, 5 pages.
Klose,"Sampling Based Scene-Space Video Processing", ACM Transactions on Graphics (TOG)—Proceedings of ACM SIGGRAPH 2015, Aug. 2015, 11 pages.
Kraus,"Depth-of-Field Rendering by Pyramidal Image Processing", EUROGRAPHICS 2007 / D. Cohen-Or and P. Slavik (Guest Editors), vol. 26 (2007), No. 3, Oct. 12, 2007, 10 pages.
Laina,"Deeper Depth Prediction with Fully Convolutional Residual Networks", 2016 Fourth International Conference on 3D Vision (3DV), IEEE, Sep. 19, 2016, 12 pages.
Lee,"Real-Time Depth-of-Field Rendering Using Anisotropically Filtered Mipmap Interpolation", IEEE Transactions on Visualization and Computer Graphics, Sep. 2008, 12 pages.
Lee,"Real-Time Lens Blur Effects and Focus Control", ACM Transactions on Graphics (TOG) 29, 4 (2010), Jul. 2010, 7 pages.
Li,"MegaDepth: Learning Single-View Depth Prediction from Internet Photos", Computer Vision and Pattern Recognition (CVPR), 2018., Apr. 2, 2018, 10 pages.
Lin,"Focal Loss for Dense Object Detection", IEEE International Conference on Computer Vision (ICCV), 2017, Oct. 2017, pp. 2980-2988.
Liu,"Deep Convolutional Neural Fields for Depth Estimation from a Single Image", Proceedings of the IEEE Conference on Computer Vision and Pattern Recognition 2015, Dec. 18, 2014, 13 pages.
Potmesil,"A Lens and Aperture Camera Model for Synthetic Image Generation", Computer Graphics, vol. 15, No. 3, Aug. 1981, 9 pages.
Silberman,"Indoor Segmentation and Support Inference from RGBD Images", Proceedings of the 12th European Conference on Computer Vision, 2012., Oct. 2012, 14 pages.
Srinivasan,"Aperture Supervision for Monocular Depth Estimation", Computer Vision and Pattern Recognition (CVPR), 2018., Mar. 29, 2018, 13 pages.
Srinivasan,"Learning to Synthesize a 4D RGBD Light Field from a Single Image", IEEE International Conference on Computer Vision, ICCV, Aug. 10, 2017, pp. 2243-2251.
Suwajanakorn,"Depth from Focus with Your Mobile Phone", Proceedings of the IEEE Conference on Computer Vision and Pattern Recognition, Oct. 2015, pp. 3497-3506.
Wang,"Learning to Detect Salient Objects with Image-level Supervision", 2017 IEEE Conference on Computer Vision and Pattern Recognition (CVPR), Jul. 2017, pp. 136-145.
Xu,"Deep Image Matting", Computer Vision and Pattern Recognition (CVPR), Apr. 11, 2017, 10 pages.
Yang, "Virtual DSLR: High Quality Dynamic Depth-of-Field Synthesis on Mobile Platforms", Electronic Imaging, Digital Photography and Mobile Imaging XII, Feb. 14, 2016, 9 pages.
Zhao,"Pyramid Scene Parsing Network", IEEE Conf. on Computer Vision and Pattern Recognition (CVPR), 2017., Apr. 27, 2017, 11 pages.

* cited by examiner

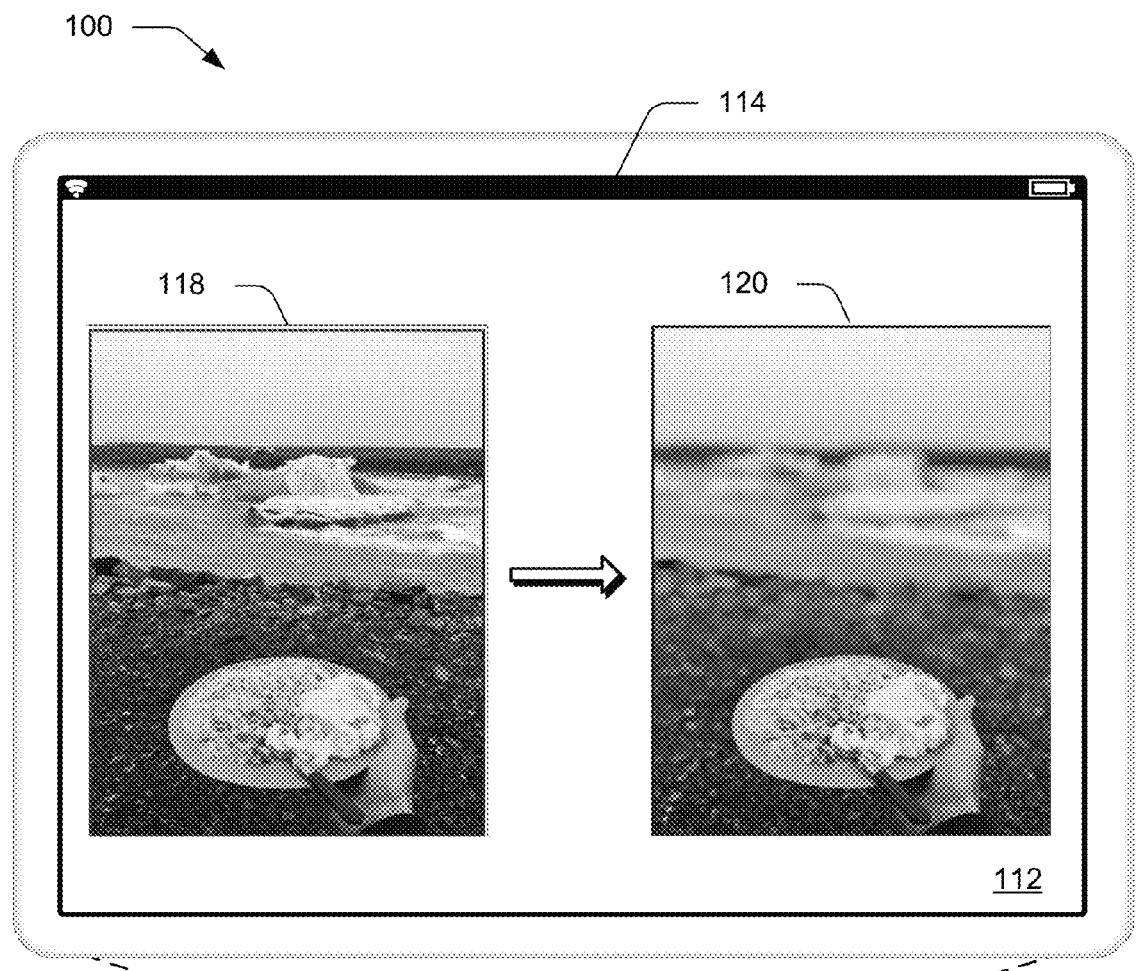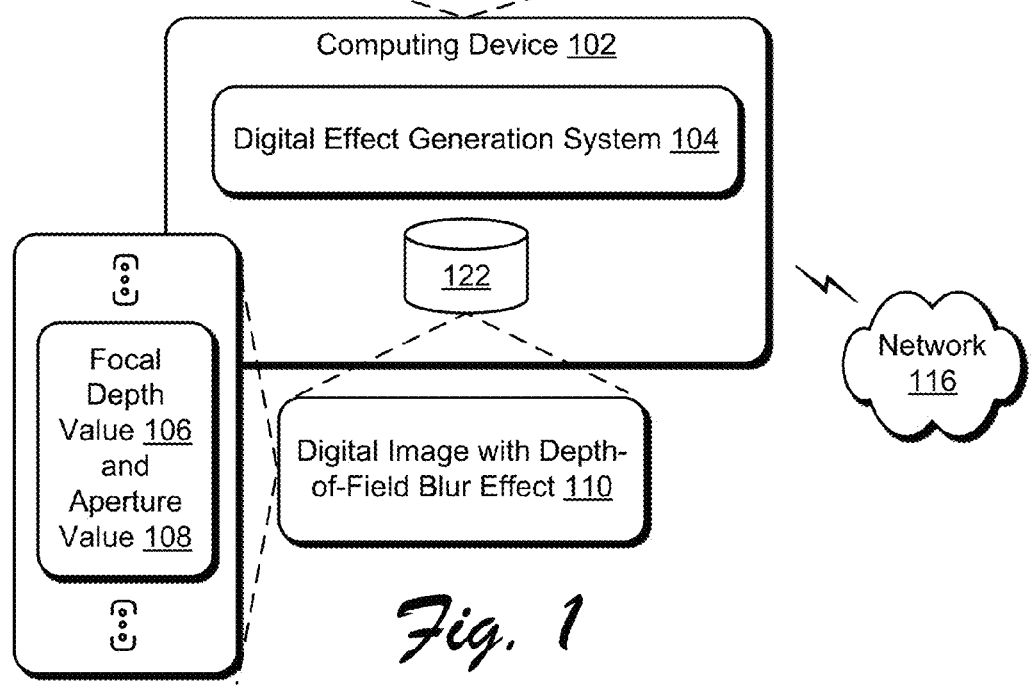
Fig. 1

300

302
Receiving user inputs specifying a focal depth value that defines a depth plane within the digital image and an aperture value describing an intensity of the depth-of-field blur effect

304
Generate a down-sampled digital image from the digital image

306
Generate a depth map from the down-sampled digital image

308
Generate a down-sampled digital image with the depth-of-field blur effect based on the focal depth value, the aperture value, and the depth map.

*Fig. 3*

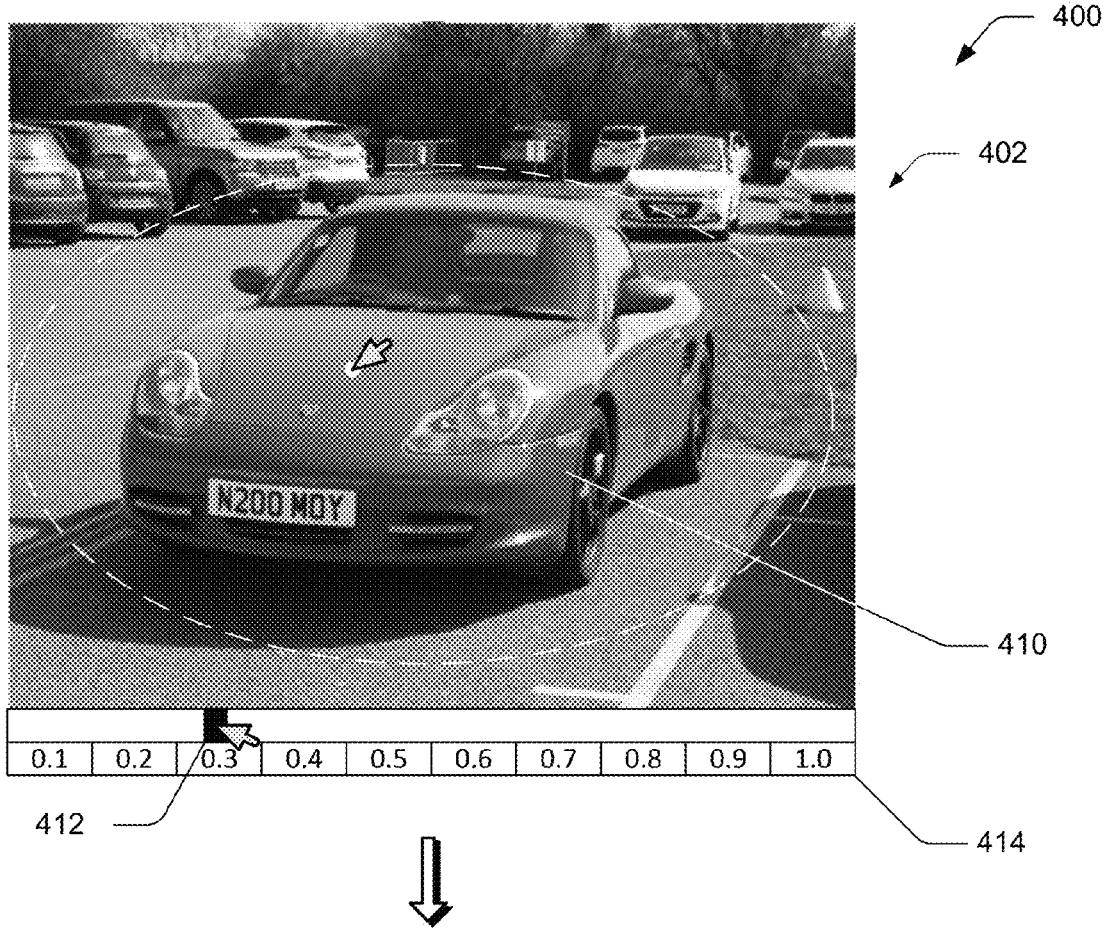
Fig. 4A

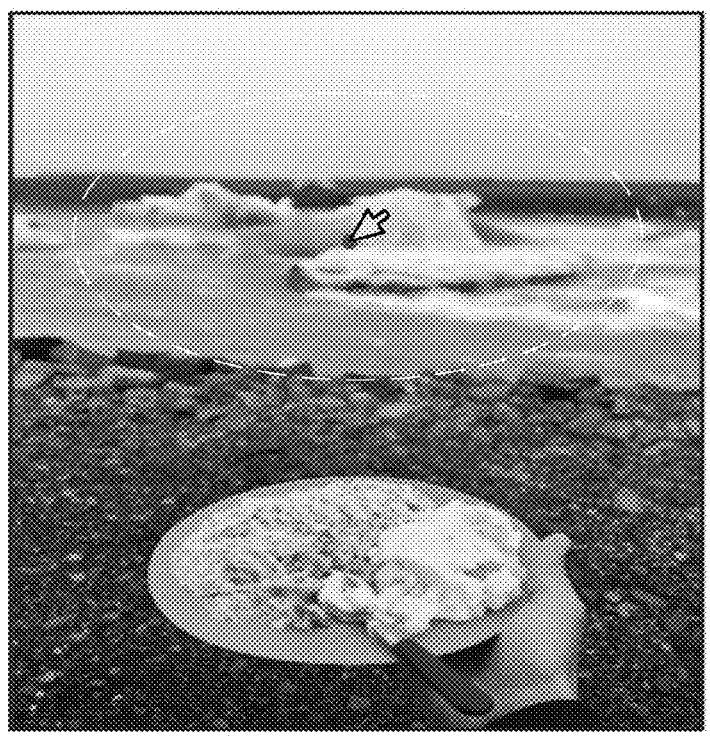
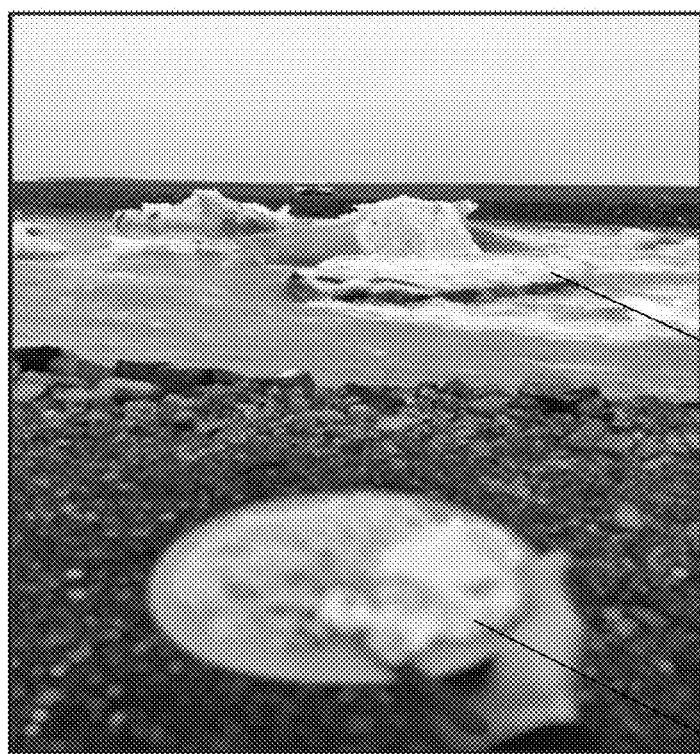
Fig. 5C

DEPTH-OF-FIELD BLUR EFFECTS GENERATING TECHNIQUES

BACKGROUND

Digital effect generation systems include digital design and editing tools that enable content creators to render digital images with a variety of digital effects via, e.g. a computing device. These digital effects may be included in digital images via tools presented in a variety of visual guides and panels with which content creators interact via, e.g., a user interface. Content creators use these tools to apply a variety of digital effects, such as blur effects, to digital images in order to transform their appearance. Digital effects can be generated on or applied to the entire digital image, specific objects in the image, or select regions within these objects, resulting in intricate digital effect configurations.

One such type of blur effect is called the depth-of-field blur effect. When a depth-of-field blue effect is applied to digital images, the effect draws a viewer's attention to a particular portion of the digital image by blurring or obscuring another portion of the image. Some form of depth-of-field blur effects are generated on digital images using conventional systems such as single-lens reflex cameras and cameras with large-aperture lenses. These systems, however, are complicated, imprecise, and present numerous challenges. For example, in addition to being expensive and requiring technical expertise for effective operation, single-lens reflex cameras do not enable users to easily and efficiently adjust the portions of the images that are blurred, thereby limiting user creativity. Cameras with large aperture lenses provide content creators with some flexibility in generating blur effects. For example, such cameras enable users to increase the aperture size, which in turn increases the blur effects applied to digital content. The resulting blur effect, however, is imprecise.

Conventional systems fail to generate blur effects that are both precise and efficient. Some of these systems use ray tracing and real camera models that improve accuracy but are time-consuming, creating inefficiencies in digital effect generation. Other conventional systems are faster, but generate errors in the form of inconsistent and unintended blur effect intensities on objects in digital images with depth discontinuities. Additionally, conventional systems do not allow users to control the focal depth (i.e. the portion of the image that the user would like to keep clear) or the intensity of the blur amount applied to digital content.

SUMMARY

A digital effect generation system, implemented via a computing device, is configured to generate depth of field blur effects on digital images with accuracy and efficiency. Moreover, the digital effect generation system described herein enables users to control the focal depth and intensity of the blur effects applied to digital images, thereby facilitating the addition of intricate digital effects to digital images with higher precision. In operation, the digital effect generation system receives user inputs specifying a focal depth value defining a depth plane within a digital content and an aperture value describing intensity of the depth-of-field blur effect applied to the digital image. The system then generates a down-sampled version of the digital image and generates a depth-map from the down-sampled digital image.

The system then generates a down-sampled digital image with the depth-of-field blur effect based on the focal depth value, aperture value, and the depth map. In one example, the depth-of-field blur effect is generated on a portion of the down-sampled digital image such that this portion appears blurred, while another portion or the remaining portion of the down-sampled digital image appears clear. The portion that appears clear corresponds to the focal depth value, while the blurred portion corresponds to another focal depth value, upon which the depth-of-field blurred effect appears. The intensity of the depth-of-field blur effect is defined by the aperture value. Thereafter, the system up-samples each of the down-sampled digital image with the depth-of-field blur effect and the depth map to generate the digital image with the depth-of-field blur effect.

In this way, the system described herein overcomes the limitations of conventional systems. Specifically, the digital effect generation system enables users to easily and efficiently control the portions in the digital image, on which, the blur effects are applied and the intensity of the digital effects applied to the digital image. Further discussion of this and other examples is included in the Detailed Description.

This Summary introduces a selection of concepts in a simplified form that are further described in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing execute in color. Copies of this patent or patent application publication with color drawing(s) will be provided by the Office upon request and payment of the necessary fee. The detailed description is described with reference to the accompanying figures. Entities represented in the figures may be indicative of one or more entities and thus reference may be made interchangeably to single or plural forms of the entities in the discussion.

FIG. 1 is an illustration of a digital effect generation system operable to enable generation of depth-of-field blur effects in digital images.

FIG. 3 is a flow diagram depicting an example procedure to generate depth-of-field blur effects using the digital effect generation system described herein with emphasis on the system having the flexibility to change focal depth value and aperture value.

FIG. 4A depicts the digital effect generation system receiving a digital image with objects that are clearly visible, e.g. objects are "in-focus," and receiving users inputs specifying a focal depth value defining a depth place in the digital image and an aperture value.

FIG. 5C depicts the digital effect generation system applying the blur effect to a different portion of the digital image due to a change in the focal depth value.

DETAILED DESCRIPTION

Overview

Figure 2:
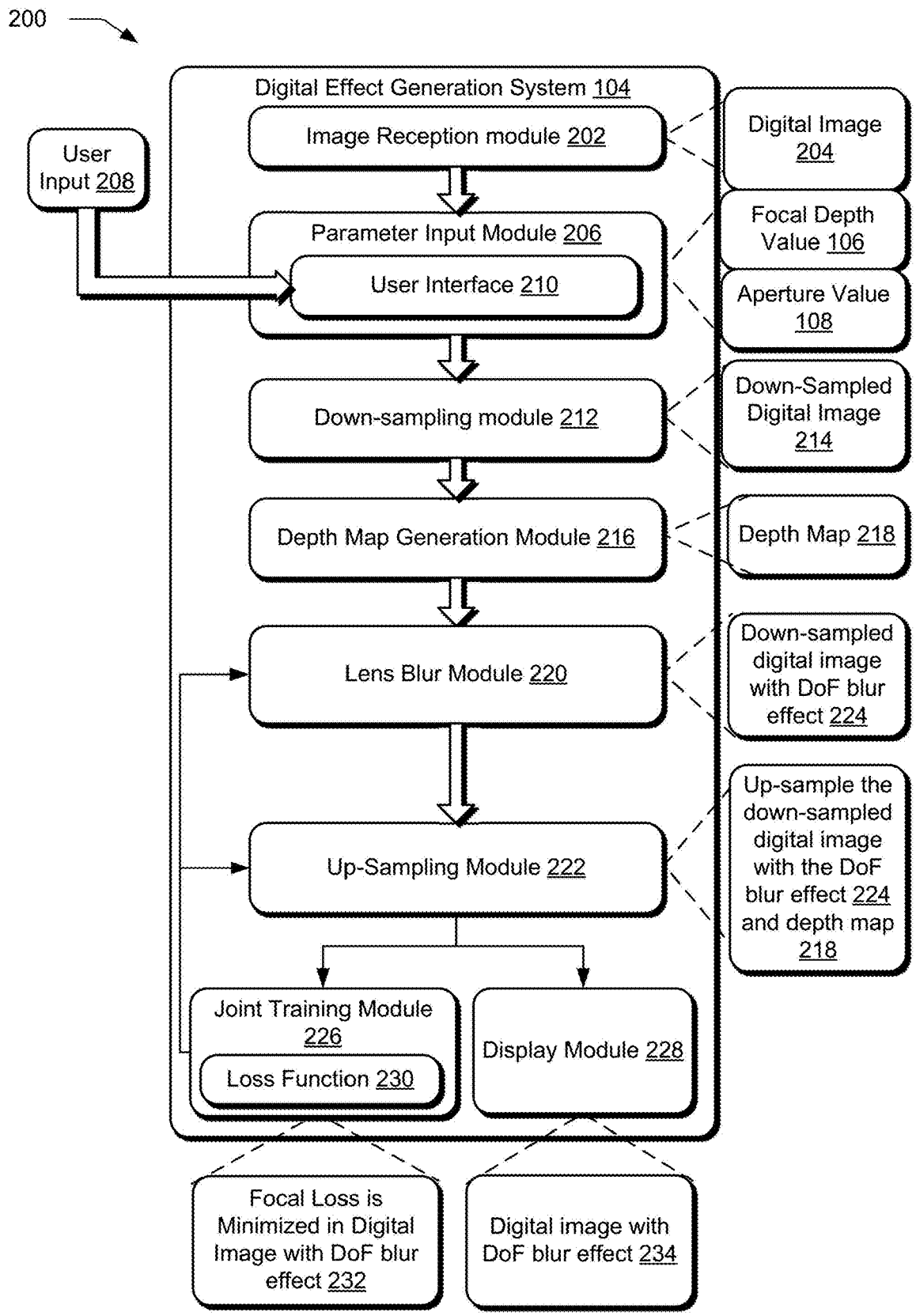
FIG. 2 depicts an example implementation of the digital effect generation system that includes a down-sampling module, a parameter input module, a depth map generation module, lens blur module, up-sampling module, joint training module, and a display module in greater detail to support depth-of-field blur effects.

Conventional digital effect generation systems present numerous challenges associated with adding digital effects to digital images, e.g. single digital images and digital images as part of a digital video. Conventionally, including intricate digital effects such as the depth-of-field blur effect to digital images require expensive systems operated by a technically savvy user. As stated, a depth-of-field blur effect draws a viewer's attention to a particular portion of the digital image by blurring or obscuring another portion of the digital image. Such an effect, when inaccurately applied or included in a manner that is not intended by the user, introduces inefficiencies in digital image design, reduces aesthetic appeal of digital images, and frustrates users. Conventional systems suffer from these deficiencies.

One challenge of conventional systems to accurately generate a depth-of-field blur effect on digital content, e.g. a single digital image, is based on an inability to accurately identify areas or spaces behind objects. Conventional systems attempt to address these inaccuracies in multiple ways. In one conventional example, ray tracing techniques and real camera models are used. While a marginal improvement in accuracy may be achieved, these conventional techniques are time-consuming, resource intensive, and require three-dimensional scene representations. Other conventional systems improve efficiency but are inaccurate due to intensity leakages at depth discontinuities within digital content. Additionally, conventional systems are unable to accurately and effectively filter foreground occlusions, artifacts, and errors located in the blurred regions.

Other conventional systems mitigate the above mentioned problems to some extent and generate depth-of-field blur effects on digital images without requiring expensive systems and technically aware users. However, these systems do not provide the flexibility to control the intensity of the blur effect applied to digital content or alter the focal depth of the digital image. As a result, users cannot effectively change the locations in digital content where the blur effect is applied or the intensity with which the effect is applied.

Digital effect generation system described herein addresses the deficiencies of conventional systems to accurately and efficiently generate depth-of-field blur effects on digital images. In one example, an image reception module of the digital effect generation system described herein receives a digital image. The received digital image has a resolution such that the objects and scenes included in it are clearly visible to a viewer. Thereafter, a parameter module of the system receives user inputs, via user interface of the computing device, specifying a focal depth value that defines a depth plane within the digital image and an aperture value describing intensity of blur effect to be applied to the image. Then, a down-sampling module of the computing device down-samples the digital image such that the down-sampled digital image has a resolution that is lower than the received digital image. Using the down-sampled digital image, a depth map generation module generates a depth map of the down-sampled digital image. Then, a lens blur module generates a down-sampled digital image with a depth-of-field blur effect based on the focal depth value, the aperture value, and the depth map of the down-sampled digital image.

In another example, the up-sampling module of the digital effect generation system performs multiple up-sampling steps to generate the digital image with the depth-of-field digital effect. Specifically, the up-sampling module up-samples each of the down-sampled digital image with the depth-of-field blur effect and the depth map to correspond with the digital image (i.e. the original digital image received by the image reception module). The result of this up-sampling is that the digital image (the one received by the image reception module) is generated accurately and efficiently to include a depth-of-field blur effect. Moreover, the digital effect generation system further enables users to control the focal depth and the aperture value, thereby enabling the system to change the locations in the digital image on which the blur effect is applied and the intensity with which these effects are applied, which is not possible using conventional techniques.

Having generated the depth-of-field digital effect on the digital image, the digital effect generation system further improves the accuracy of the applied depth-of-field digital effect by reducing the focal loss throughout the digital image with the depth-of-field blur effect, especially in areas within the image that have larger errors, e.g. at the boundary of objects with depth discontinuities. The boundary regions of objects with depth discontinuities contribute significantly to the perceived quality, and by consequence, the accuracy of the depth-of-field digital effect of the digital image. In contrast, conventional systems fail to use focal loss functions, which results in the blurring of boundary regions that should be in high focus.

In this way, the digital effect generation system described herein addresses the deficiencies present in conventional digital effect generation systems. Specifically, this system has the advantage of enabling users to control the focal depth, which identifies the portion in the digital image that maintains its resolution, and the aperture value, which identifies the intensity of blur effect that is applied to regions that do not correspond to the focal depth. The system enables the user to change portions of the image that are blurred and the intensity with which these areas are blurred, thereby providing a versatile set of digital effect inclusion options. Another advantage of the digital effect generation system is that it reduces inaccuracies in generating digital effects by minimizing focal loss throughout the digital image with the depth-of-field blur effect, including at object boundaries that have depth discontinuities—regions that disproportionately contribute to the perceived quality and appearance of digital effects. The system does so by jointly training both the lens blur module and the up-sampling module using a unique focal loss function. Finally, the digital content generation system has increased efficiency when compared with conventional systems because it generates, using the lens blur module, blur amounts on a compressed feature space. In this way, the system described herein reduces computational resource consumption, thereby improving efficiency.

In the following discussion, an example environment is described that may employ the digital effect generation system described herein. Example procedures are also described which may be performed in the example environment as well as other environments. Consequently, performance of the example procedures is not limited to the example environment and the example environment is not limited to the performance of the example procedures.

Example System and Device

FIG. 1 is an illustration of digital effect generation system in which depth-of-field blur effect techniques are employed. The illustrated environment 100 includes a computing device 102, which is configured in a variety of ways.

The computing device 102, for instance, may be configured as a desktop computer, a laptop computer, a mobile device, e.g. assuming a handheld configuration such as a tablet or mobile phone as illustrated, and so forth. Thus, the computing device 102 may range from full resource devices with substantial memory and processor resources (e.g. personal computers, game consoles) to a low-resource device with limited memory and/or processing resources (e.g. mobile device). Computing device 102 is representative of a single computing device or a plurality of different devices, such as multiple servers utilized by a business to perform operations "over the cloud" as described in FIG. 14. Additionally, although illustrated as implemented locally at computing device 102, functionality of digital effect generation system 104 may also be implemented as whole or part via functionality available via the network 116, such as part of web service or "in the cloud."

The computing device 102 is illustrated as including a digital effect generation system 104. In one example, the digital effect generation system 104 is implemented at least partially in hardware of computing device 102 to apply depth-of-field blur effects to digital images with accuracy and precision. A depth-of-field blur effect is a type of digital effect that, when applied to a digital image, draws a viewer's attention to a specific portion of the image by blurring or obscuring another portion of the image. In the illustrated example, a digital image 118 is received which is then processed by the digital effect generation system 104 to generate a digital image having a depth-of-of field blur effect 120 applied, e.g., to cause the plate to remain in focus and blur the background around the plate. An example of the digital image 118 as processed by the digital effect generation system 104 is illustrated as digital image with depth-of-field blur effect 120 as stored in a storage device 122.

As previously described, the challenges present in conventional systems in applying a depth-of-field blur effect is that these systems are not designed to enable the adjustment of focal depth values and aperture values, which limit the type of depth-of-field digital effects that can be applied to digital images. Another challenge in conventional systems is that these systems do not apply depth-of-field blur effects to digital images with accuracy, in part because the systems cannot identify areas or spaces behind objects, cannot filter occlusions in the foreground effectively, and cannot address artifacts and errors located in high contrast areas in blurred regions or in object boundaries with depth discontinuities in the digital image.

Digital effect generation system 104 addresses these challenges and generates depth-of-field blur effects to digital images with accuracy and with the optimal use of computational resources. As stated, a depth-of-field blur effect, when generated to a digital image, draws a viewer' attention to a portion of the image by blurring or obscuring another portion of the image. Precisely blurring the portion using the techniques described herein is based on identification of a depth plane within the digital image 118. This may be used to specify a particular object that is not blurred (e.g., the plate in the illustrated example through use of a "tap" gesture received via the user interface 112) or to specify a particular object that is to be blurred, e.g., the background in the illustrated example through use of a "tap" gesture received via the user interface 112.

To achieve this, digital effect generation system 104 receives a digital image (which includes objects that are clearly visible) displayed on display device 114. Additionally, the system also receives user inputs specifying focal depth value 106 and aperture value 108 via the user interface 112 of the computing device 102. From the specified focal depth value 106, digital effect generation system 104 identifies the portion of the digital image that is to maintain its clarity and the portion that is to be blurred. Focal depth value 106 may, for example, be specified by the user input, e.g. using a cursor control device, gestures etc., which includes moving a cursor over a portion of the digital image and selecting said portion via user interface 112. Aperture value 108 may similarly be specified by user input, e.g. using a cursor control device, gestures etc., and selecting an aperture value from a range of values listed in a table that appears on user interface 112.

Based on these values, digital effect generation system 104 has the basic data used to begin the process that results in the application of the depth-of-field blur effect to the digital image. Next, the system down-samples the received digital image such that the resolution of digital image is reduced as compared to the received digital image. From this, the system generates a depth map of the down-sampled digital image and generates a depth-of-field blur effect on the down-sampled digital image. The system, by down-sampling the received digital image—which now is a low-resolution compressed feature space—is able to generate the depth-of-field blur effect by optimally using the computational resources.

From this, digital effect generation system 104 selectively up-samples the down-sampled digital image with a depth-of-field blur effect and the depth map to correspond with the received digital image in order to generate a digital image with a depth-of-field blur effect. The digital image with the depth-of-field blur effect 110 has a clarity and resolution that matches the received digital image. The up-sampling performed by the system results in increased accuracy in appearance of the depth-of-field blur effect on the digital image. Specifically, the boundaries of objects that straddle blurred portion of the digital image 118 (e.g., the plate) and the portion of the digital image that remains clear are accurately blurred. To further improve the accuracy of the depth-of-field blur effect applied to the image, digital effect generation system implements a unique focal loss algorithm on the digital image with the depth-of-field blur effect.

In this way, digital effect generation system 104 overcomes the deficiencies in conventional system. In sum, unlike in conventional systems, digital effect generation system 104 enables adjustment of focal depth value 106 and aperture value 108, which allows users to change the locations where the depth-of-field blur effect is applied and the intensity with which the effect is applied on the digital image. Digital effect generation system 104 also applies a depth-of-field blur effect to the digital image in a manner that optimizes available computational resources and memory. Finally, the unique focal loss function implemented by the digital effect generation system 104, via computing device 102, minimizes focal loss at boundaries of objects within the digital image that have depth discontinuities, which disproportionately add to the lack of quality and appearance of the image's depth-of-field blur effect. Further discussion of these and other examples is included in the following sections and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Generation of a Depth-of-Field Blur Effect

FIG. 2 depicts a system 200 in an example operation of the digital effect generation system 104 shown in greater detail. FIG. 3 depicts a procedure 300 in an example operation of the digital effect generation system 104 to generate depth-of-field blur effects on digital images.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is made interchangeably to FIGS. 2-14.

Figure 4B:
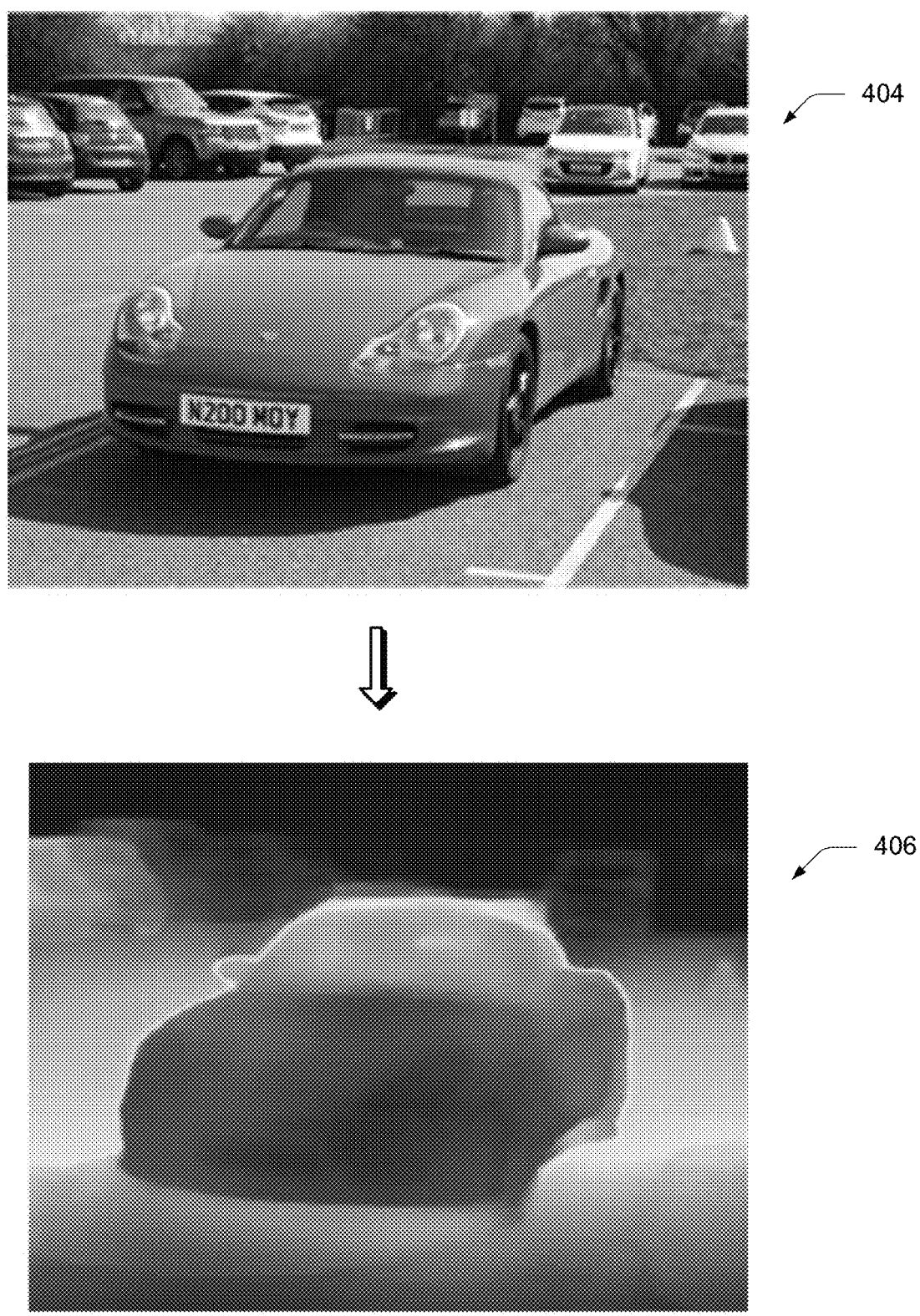
FIG. 4B depicts the digital effect generation system generating a depth map from the down-sampled digital image.
Figure 4C:
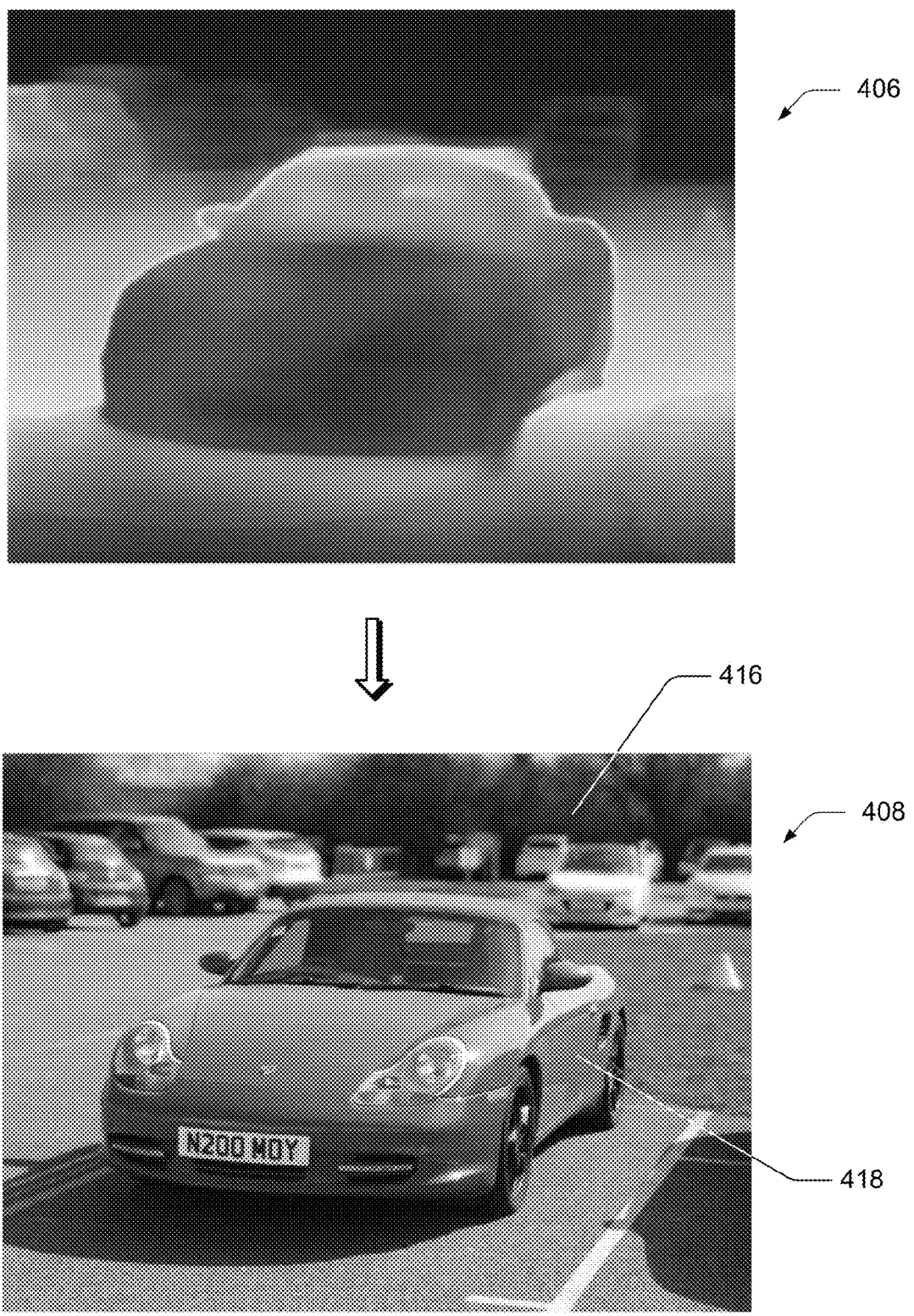
FIG. 4C depicts the digital effect generation system that generates a down-sampled digital image with a depth-of-field blur effect.

An example operation of digital effect generation system 104 is depicted in example operation 400 shown in FIGS. 4A-4C, which includes first, second, third, and fourth stages 402, 404, 406, and 408. The example operation of digital effect generation system 104 will be described in detail with the implementation being performed by the modules depicted in FIG. 2.

At first stage 402 of example operation 400, image reception module 202 of the digital effect generation system 104 receives digital image 204—a red colored vehicle in the foreground with a variety of other vehicles in the background. The objects, scenes, and colors in the digital image are clearly visible, signifying the clear and "all-in-focus" resolution of the digital image 204. Additionally, at first stage 402, the parameter module 206 receives user input 208, via cursor control device, gestures, and so forth as part of computing device 102, specifying a focal depth value 106 that defines a depth plane within the digital image and an aperture value 108 describing an intensity of the depth-of-field blur effect (block 302). The focal depth value 106 defining the depth plane is shown in the form of a white circle that appears on the front hood of the vehicle 410 and the aperture value is shown as being specified by the user manipulating the position of bar 412 along a range of values included in table 414. It is noted that these values are for example purposes only and other fractional values may be utilized.

At second stage 404, down-sampling module 212 down-samples digital image 204 (block 304) to generate a down-sampled digital image 214. As depicted at second stage 404, digital image 204 shows objects, scenes, and colors less clearly. The size of the down-sampled digital image 214, at second stage 404, has also been shown in a reduced form to indicate down-sampling. At third stage 406, a depth map generation module 216 generates a depth map 218 (block 306) of from the down-sampled digital image 214. As shown, the depth map indicates certain portions at a particular depth level in bright orange and other portions of the down-sampled digital image 214 as dark blue. These colors signify varying depth plane levels. Having generated the depth map, lens blur module 220 generates the down-sampled digital image with a depth-of-field blur effect based on three inputs—the depth map 218, the focal depth value 106, and aperture value 108.

Specifically, when generating the down-sampled digital image with the depth-of-field blur effect, the lens blur module 220 utilizes the depth map 218, the focal depth value 106, and the aperture value 108 to generate a depth-of-field blur effect 224 (block 308). Specifically, the depth-of-field blur effect is generated on a portion of the down-sampled digital image such that this portion appears blurred, while another portion of the down-sampled digital image appears clear. The portion that appears clear corresponds to the focal depth value, while the blurred portion corresponds to another focal depth value, upon which the depth-of-field blurred effect appears. The result of is the generation of a down-sampled digital image with a depth-of-field blur effect as depicted in fourth stage 408. As depicted, the red colored automobile and a portion of the parking spot on which it is shown (first portion 418) appears clear and in-focus when compared to the vehicles in its background (second portion 416), which appear blurred.

Figure 5A:
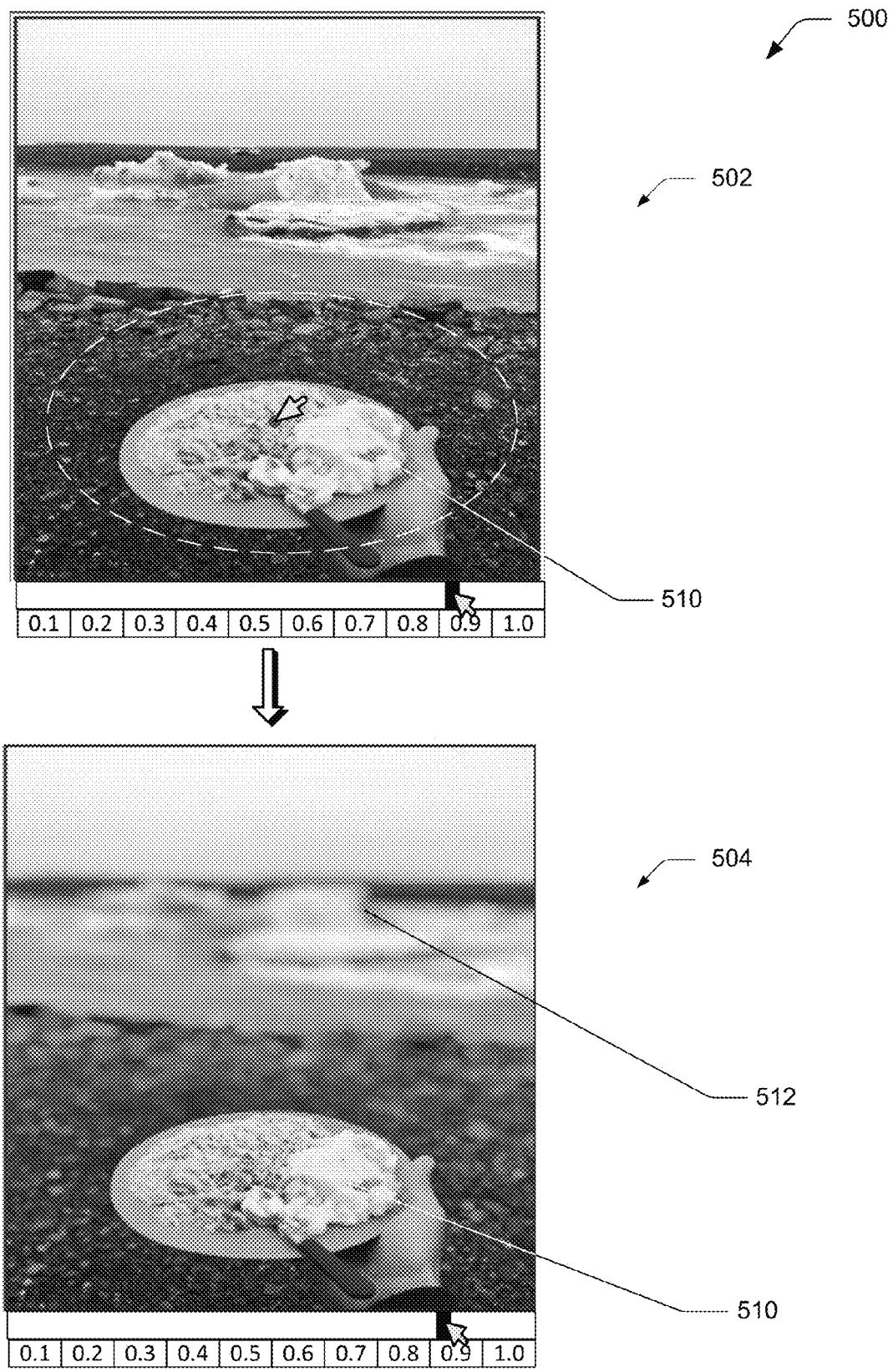
FIG. 5A depicts the digital effect generation system generating a digital image with a depth-of-field blur effect with accuracy and efficiency.
Figure 5B:
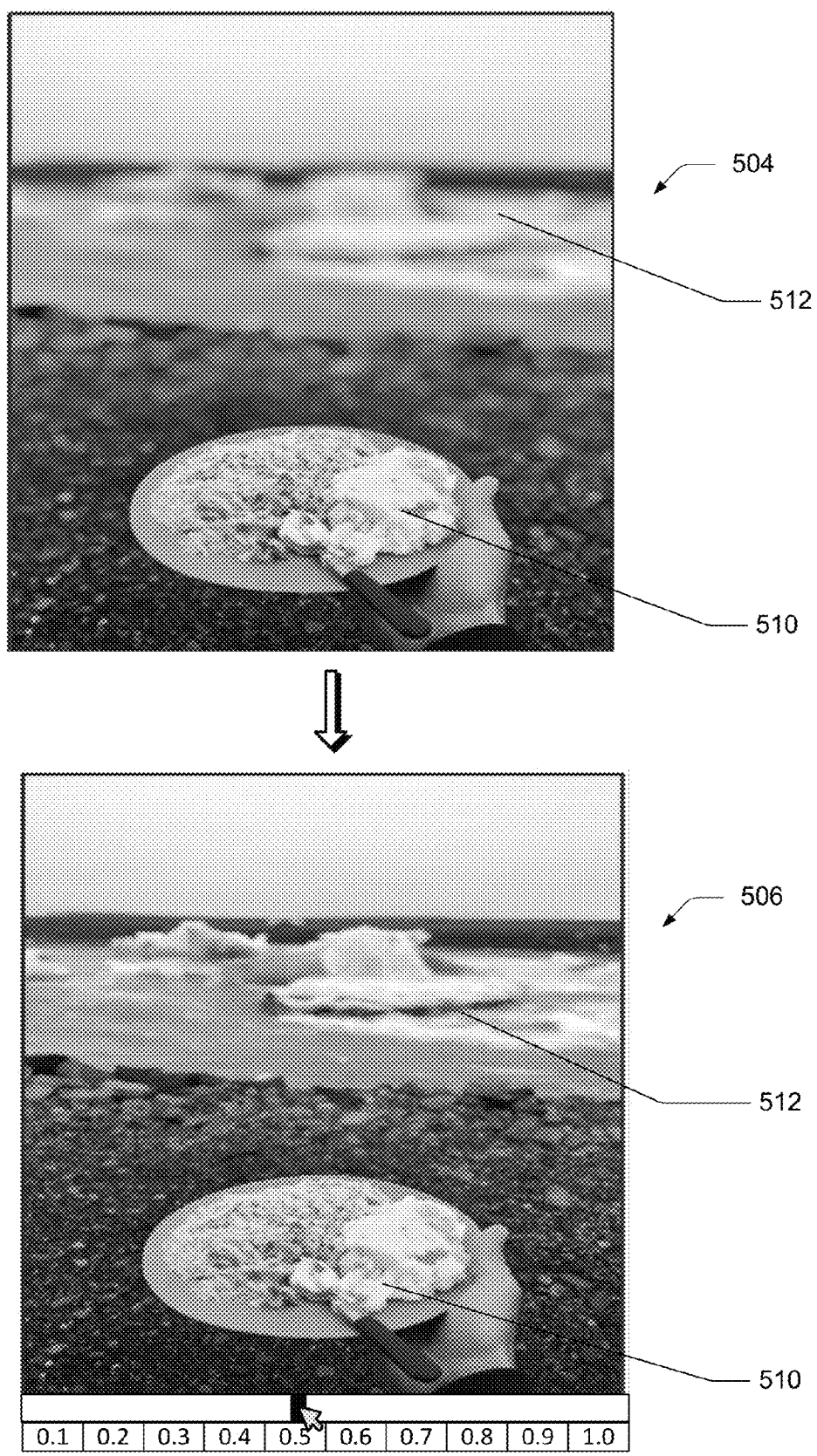
FIG. 5B depicts the digital effect generation system reducing the intensity of the blur effect applied to the digital image by decreasing the aperture value received in FIG. 5A.

FIGS. 5A—5C depict an example operation 500 of digital effect generation system 104 that addresses limitations present in conventional digital effect generation systems. Unlike conventional systems, digital effect generation system 104 adjusts focal depth values and aperture values effectively, which enables users to control the intensity of the depth-of-field blur effect applied to digital images. The results of a user's interaction with a digital image using digital effect generation system 104 is shown in first, second, third, and fourth stages 502, 504, 506, and 508 of FIGS. 5A-5C.

At first stage 502, a digital image is received by image reception module 202 and focal depth value 106 and aperture value 108 are received by parameter module 206. As shown, the plate of food appears in the foreground of the image and shares a level of resolution with the waves, rocks, and ice in the background of the image. At first stage 502, aperture value 108 is the first aperture value and focal depth value 106 is the first focal depth value. At second stage 504, based on the focal depth value 106 and aperture value 108, lens blur module 220 generates a depth-of-field blur effect on specific portions of the digital image. Specifically, the lens blur module 220 generates a blur effect on the portion of the image that includes the waves, rocks, and ice (second portion 512) and does not apply the blur effect on the portion of the image that includes the plate of food (first portion 510). As such, the portion of the image including the waves, rocks, and ice appears blurred, while the portion including the plate of food appears clear. At third stage 506, parameter module 206 receives additional user inputs specifying a second aperture value, which decreases the intensity of the blur effect applied to second portion 512 of the digital image. In this instance, the blur effect generated on the second portion—the portion including waves, rocks, and ice—is depicted. Alternatively, increasing the aperture value increases the intensity of the blur effect applied to the second portion 512 (not shown).

As shown, the waves, rocks, and ice appears less blurred when compared to second stage 504. Finally, in addition to receiving the second aperture value, fourth stage 508 shows parameter module 206 receiving a second focal depth value in that changes the depth plane on which the blur effect is applied. Based on the second aperture value and second focal depth value, lens blur module 220 does not generate a blur effect on another part of the portion of the image that includes the waves, rocks, and ice (third portion 514), while generating the blur effect on another part of the foreground portion of the image, which includes the plate of food. As depicted in FIG. 5C, the plate of food (fourth portion 516) appears blurred, while the waves, rocks, and ice (third portion 514) appears clear. In this way, unlike conventional systems, digital effect generation system 104 facilitates the adjustment of aperture values and focal depth values, which enables the system to control the intensity of the depth-of-field blur effect and the portion, e.g. depth plane, of the digital image on which the blur effect appears.

Figure 6:
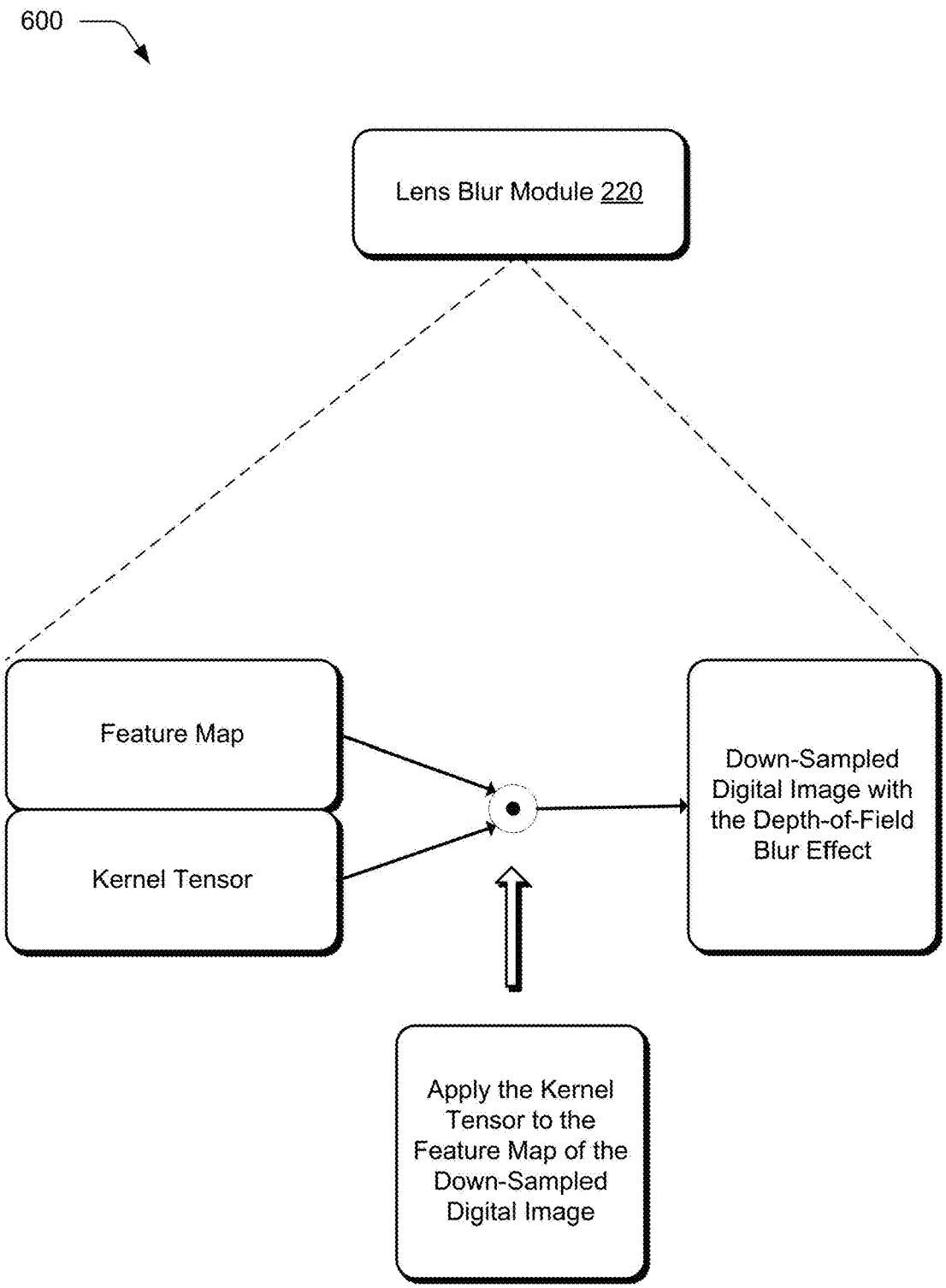
FIG. 6 depicts the lens blur module of the digital effect generation system configured to generate a depth-of-field blur effect on a down-sampled digital image.

FIG. 6 depicts in detail an example operation 600 of lens blur module 220 of the digital effect generation system 104 generating the down-sampled digital image with the depth-of-field blur effect. A representation of the algorithm used generate the down-sampled digital image with the depth of field blur effect is presented below as:

$$L_i(x, y) = \sum_{j=1}^{c} K(x, y, j) \times F_i(x, y, j)$$

$L_i(x, y)$ denotes the color value at location (x, y) within the down-sampled digital image. In other words, $L_i(x, y)$ is the result of generating the depth-of-field blur effect selectively on certain portions of the down-sampled digital image, which gives the down-sampled digital image the depth-of-field blur effect. $F_i(x,y,j)$ and $K(x,y,j)$ represents each of the feature map generated from the depth map of the down-sampled digital image and a kernel tensor. The kernel tensor is applied to the feature map of the down-sampled digital image to generate the down-sampled digital image the depth-of-field blur effect—depicted in FIG. 4C.

Lens blur module 220 generates the feature map in a two-step process. First, lens blur module 220 receives the down-sampled digital image and filters it through multiple convolutions layers. Each of these convolution layers generate feature maps—intermediate feature maps—that encode low level features, e.g. color, clarity, texture, etc., associated with image patches included in the down-sampled digital image. An image patch represents a cluster or group of pixels that share similar properties, e.g. color, texture etc. Second, the lens blur module concatenates the intermediate features maps outputted from each of the convolution layers to generate the feature map represented by $F_i(x,y,j)$.

Lens blur module 220 then generates the kernel tensor based on the depth map of the down-sampled digital image, focal depth value 106, and aperture value 108. Specifically, the lens blur module 220 uses the generated kernel tensor to infer blur amounts of each image location of the down-sampled digital image and then applies the kernel tensor to the generated feature map. The application of the kernel tensor (using the inferred blur amounts) to the feature map results in the generation of the down-sampled digital image with the depth-of-field blur effect. In this way, digital effect generation system 104 uses lens blur module 220 to efficiently and accurately generate depth-of-field blur effects on digital images.

Figure 7A:
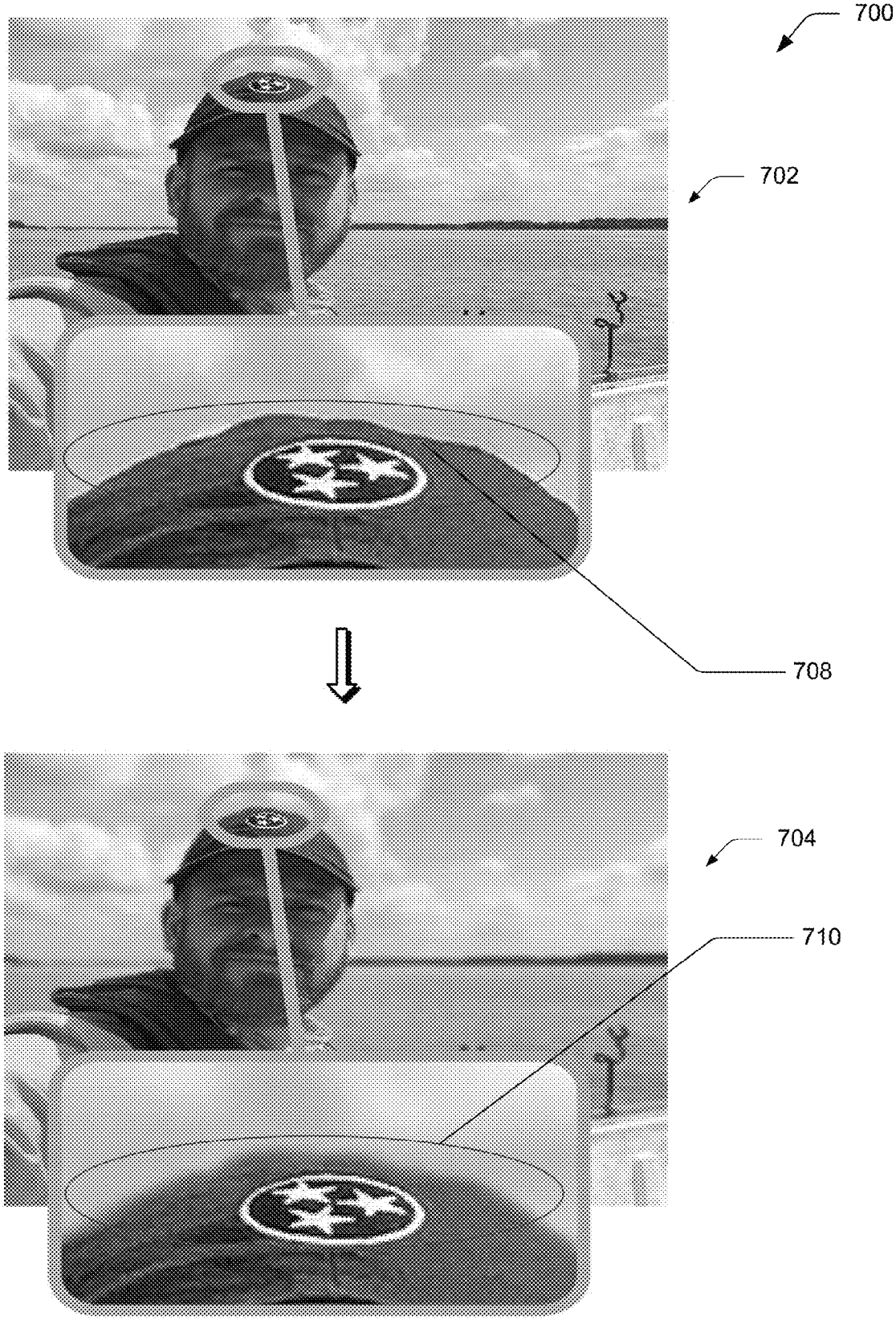
FIG. 7A depicts deficiencies present in conventional digital effect generation systems implementing conventional lens blur algorithms.

FIG. 7A depicts example operation 700 of conventional digital effect generation systems that use conventional lens blur methods, namely the inaccurate blurring at the boundaries of objects and other portions within the digital images. The result of conventional digital effect generation systems applying a blur effect on a digital image are depicted using first and second stages 702 and 704 in FIG. 7A. At first stage 702, a digital image with objects with uniform clarity levels are depicted. The individual wearing the hat is depicted in the foreground with the same clarity level as the sky, clouds, and trees in the background. At second stage 704, the user intended effect is that the sky, clouds, and trees appear blurred, while the individual wearing the hat appears clear. However, when the boundary of the hat is examined more closely, it is evident that the top portion of the hat is blurred, as a result of an inaccurate application of the blur effect on the digital image. Consequently, the perceived quality of the blur effect generated on the digital image is adversely affected.

Figure 7B:
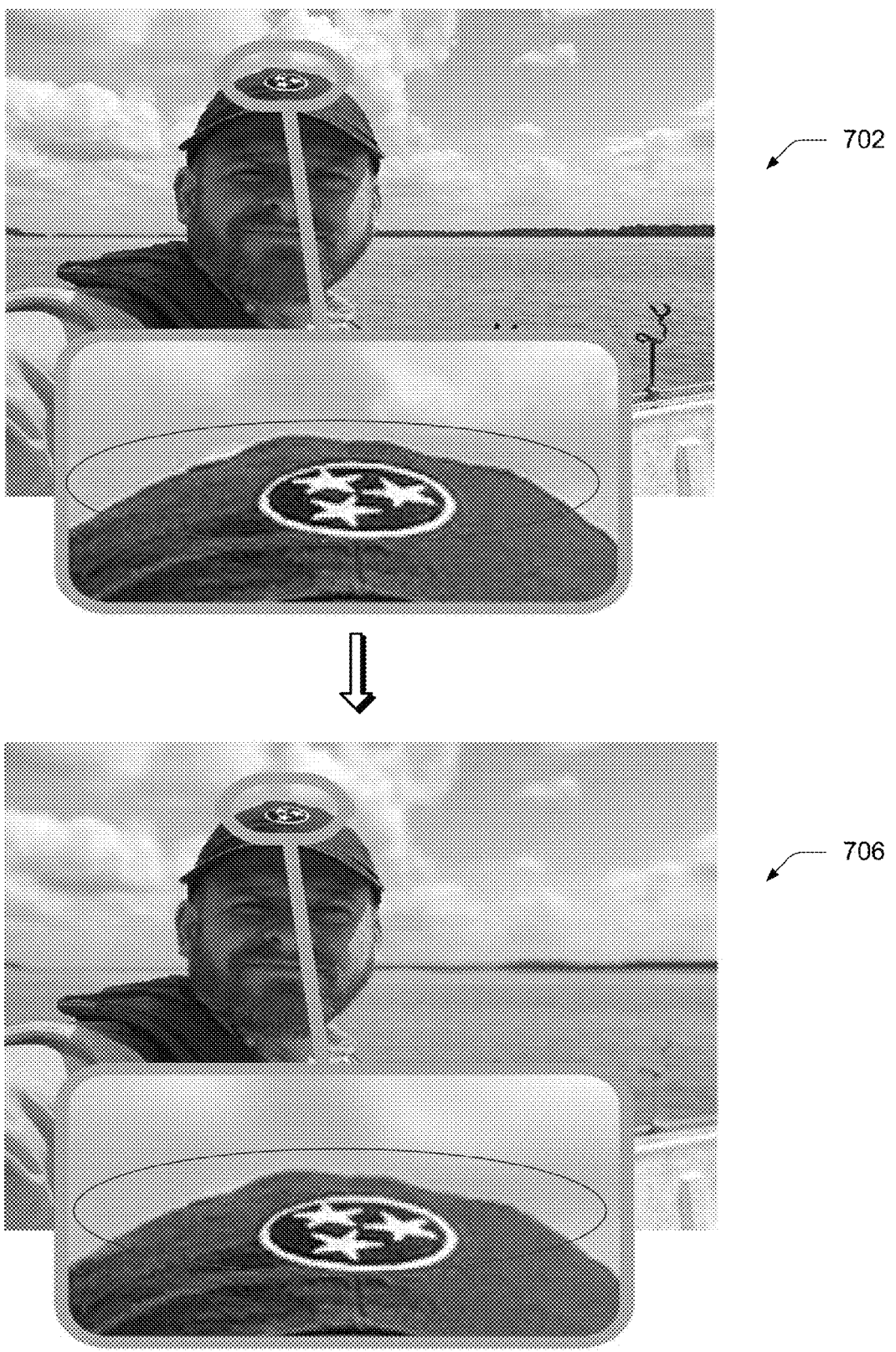
FIG. 7B depicts the digital effect generation system described herein overcoming the deficiencies present in conventional digital effect generation systems. The object boundary depicted in FIG. 7A is blurred with increased accuracy using the lens blur module of the digital effect generation system described herein.

In contrast, FIG. 7B depicts digital effect generation system 104 overcoming this limitation by using the lens blur module 220 to generate the depth-of-field blur effect on a down-sampled digital image as shown in FIGS. 4A-4C. At third stage 706 in FIG. 7B, just as in second stage 704, the individual in the foreground is not blurred and the sky, clouds, and trees in the background are blurred. However, unlike the result in FIG. 7A, the boundary of the hat retains its clarity. In this way, digital effect generation system 104 overcomes the limitations of conventional system—namely by accurately blurring the object boundaries within digital images using lens blur module 220.

Figure 8:
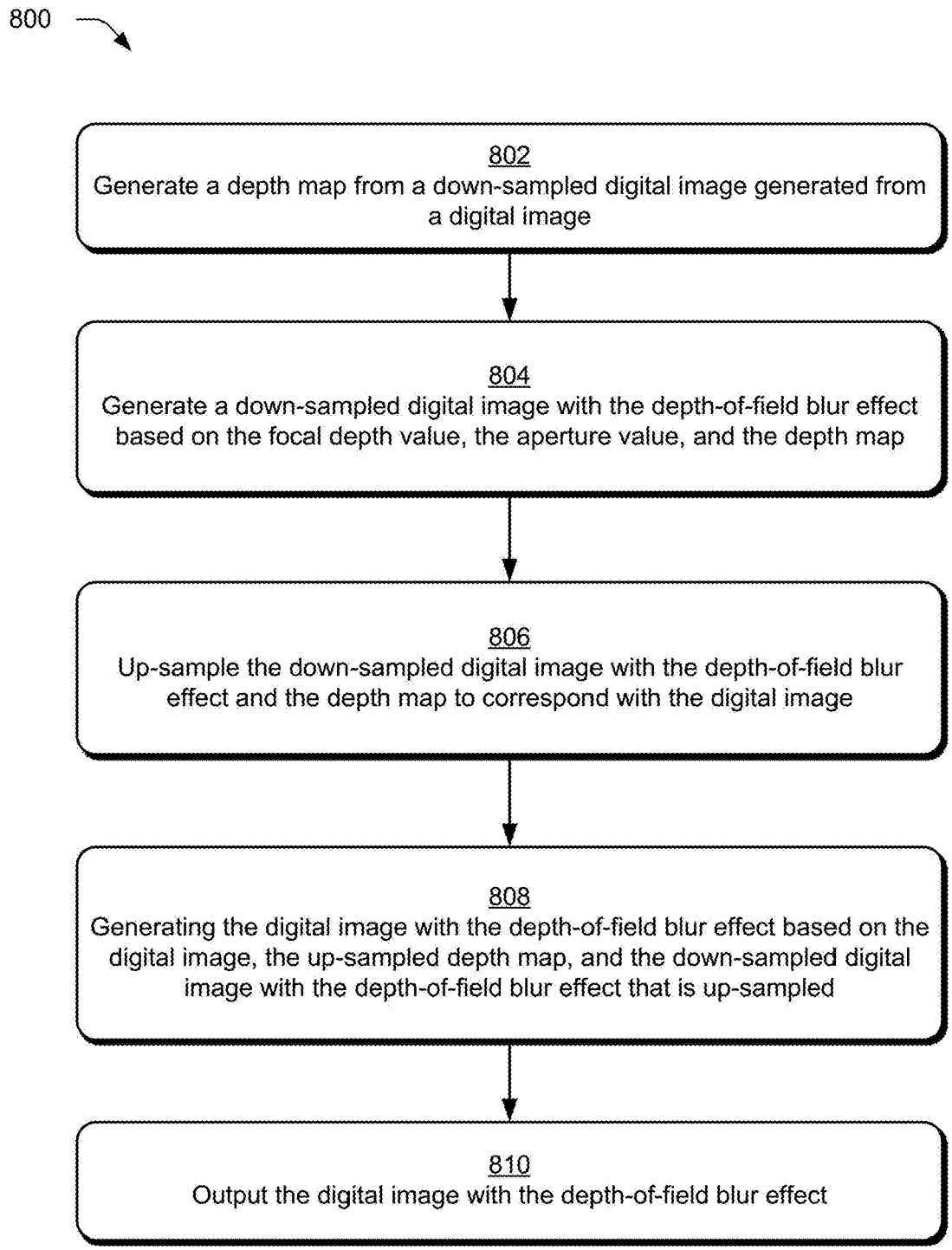
FIG. 8 is a flow diagram depicting an example procedure to generate depth-of-field blur effects using the digital effect generation system described herein on a digital image with accuracy and efficiency.
Figure 9A:
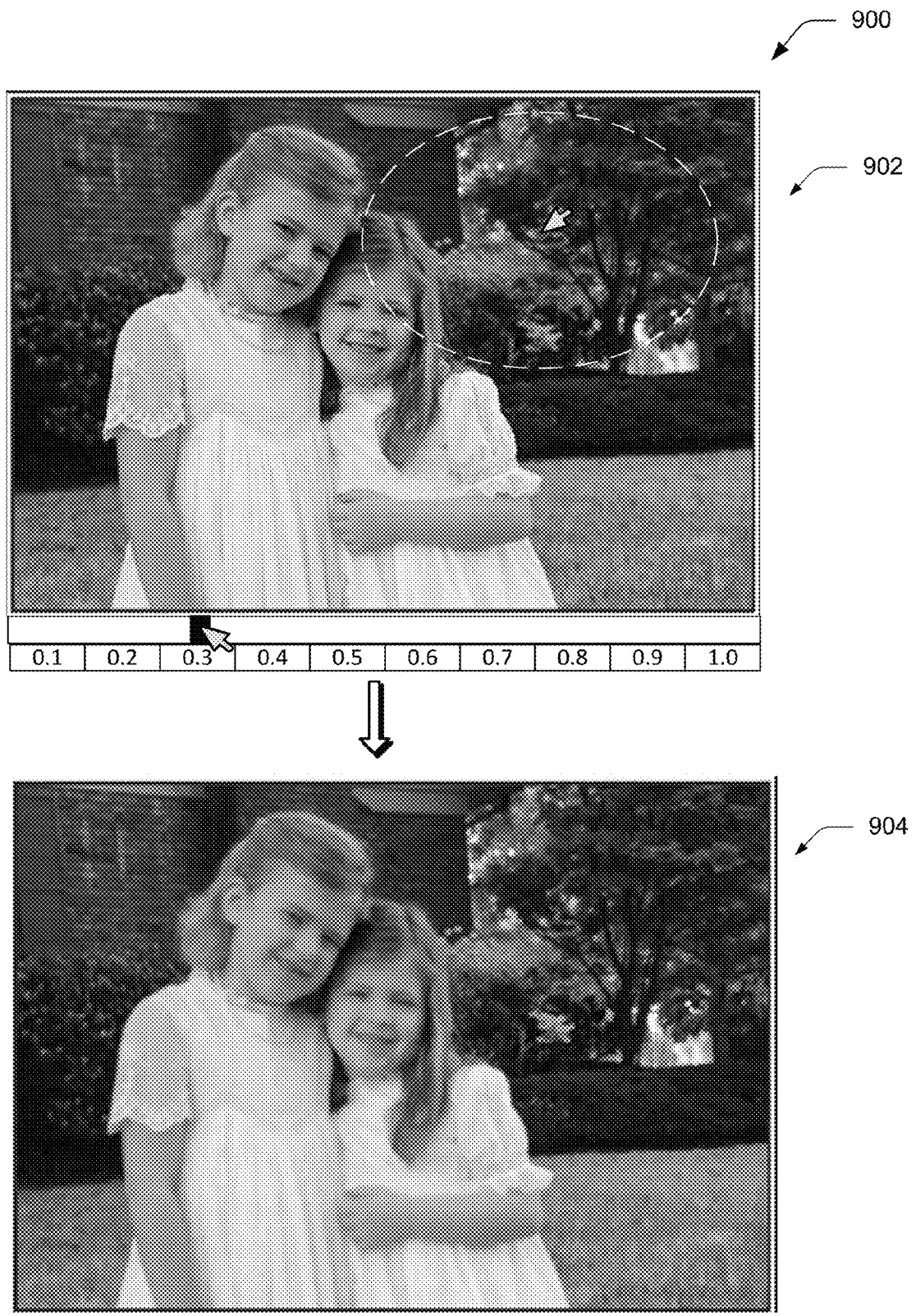
FIG. 9A depicts the digital effect generation system generating a digital image with a depth-of-field blur effect accurately with the use of the up-sampling module.
Figure 9B:
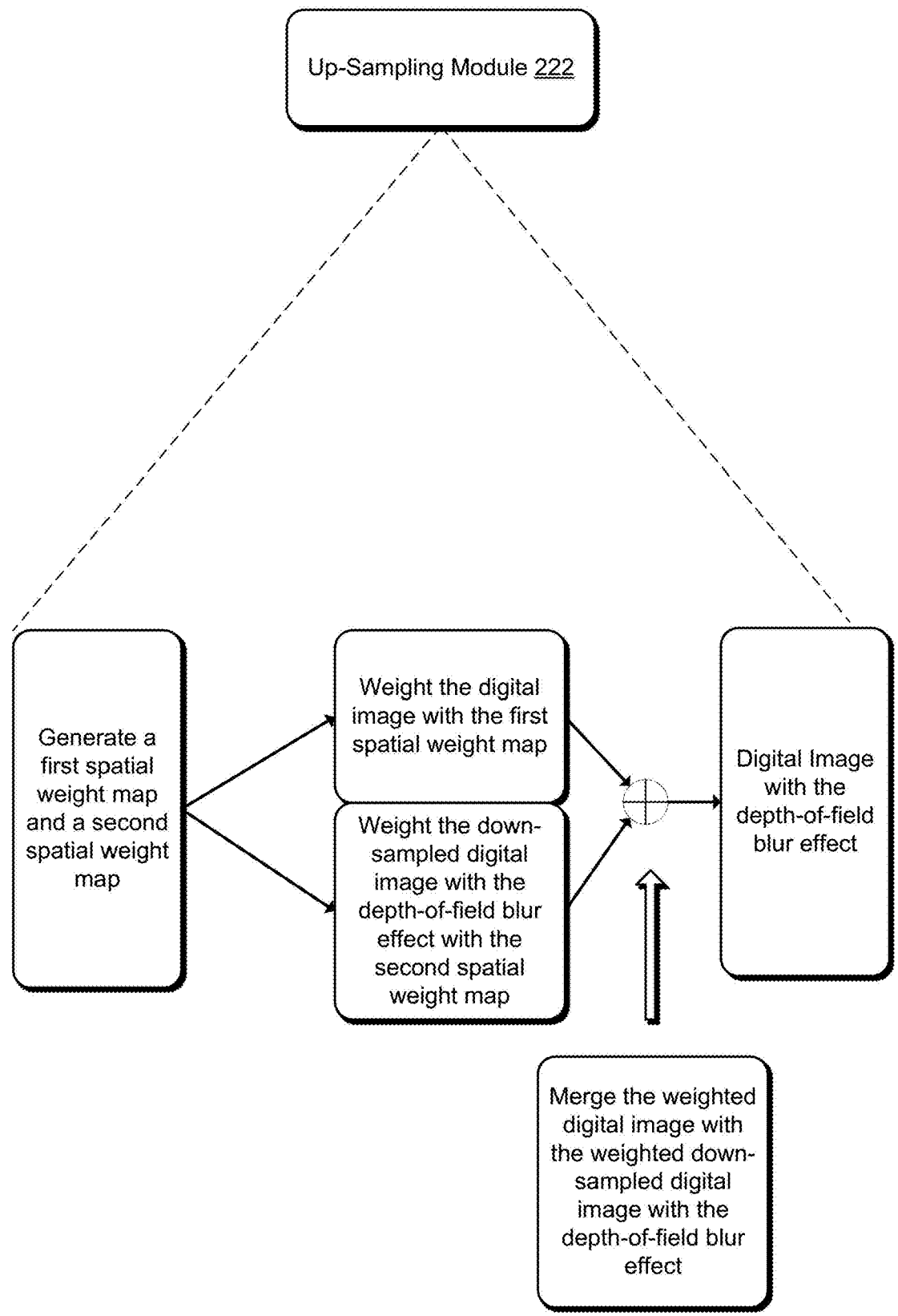
FIG. 9B depicts the operation of the up-sampling module of the digital effect generation system.

FIG. 8 depicts procedure 800 an example operation of digital effect generation system 104 described herein. In contrast with the procedure depicted in FIG. 3, FIG. 8 includes the steps of implementing an up-sampling operation, generating a digital image with a depth-of-field blur effect that matches the clarity and resolution of digital image 204 (the original one received by image reception module 202), and outputting the digital image with the generated depth-of-field blur effect that matches the resolution of digital image 204. An example operation 900 of digital effect generation system 104 is depicted in FIGS. 9A and 9B. FIG. 9A depicts digital effect generation system 104 applying a depth-of-field blur effect to a digital image using an up-sampling step performed by up-sampling module 222 via computing device 102. This application is depicted using first and second stages 902 and 904 of FIG. 9A. FIG. 9B details the operation of up-sampling module 222 of digital effect generation system 104.

Just as in the procedure depicted in FIG. 3, image reception module 202 receives digital image 204—the image, in this example, includes two girls in the foreground with trees and part of a house in the background. Additionally, at first stage 902 parameter module 206 receives user input 208 via user interface 210 of computing device 102, specifying focal depth value 106 and aperture value 108. The focal depth value 106 defining the depth plane is shown in the form of a red circle that appears on the top right portion of digital image 204 and the aperture value 108 is shown as being specified by the user manipulating the position of the cursor along a range of values. It is noted that these values are for example purposes only and other fractional values may be included. Thereafter, down-sampling module 212 generates a down-sampled digital image 214 from digital image 204. By down-sampling, digital effect generation system 104 reduces the resolution of each of the objects included in digital image 204. In effect, all objects within the digital image appear slightly more blurred.

The procedural steps described in FIG. 8, begin after digital effect generation system 104 down-samples digital image 204 using down-sampling module 212. Initially, the depth map generation module 216 generates a depth map from down-sampled digital image digital image 214 that was generated from the digital image 204 (block 802). Similar to third stage 406 depicted in FIG. 4B, an example depth map can be represented such that portions at a particular depth level may be represented by one color and other portions at varying depth levels in the down-sampled digital image can be represented by different colors. In FIG. 9A, the top right portion of digital image 204—being shown in the form of a red circle—defines a depth plane that could be depicted by a bright blue color (not shown). This depth plane represents the objects in the background, namely the scrubs, trees, and part of the house. Another color, such as bright orange (not shown), may represent the objects in the foreground, namely the two girls.

Thereafter, lens blur module 220 of digital effect generation system 104, via computing device 102, generates a down-sampled digital image with the depth-of-field blur effect based on the focal depth value, the aperture value, and the depth map (block 804). Lens blur module 220 renders the depth-of-field blur effect onto the down-sampled digital image using the following algorithm.

$$L_i(x, y) = \sum_{j=1}^{c} K(x, y, j) \times F_i(x, y, j)$$

When implementing the above algorithm, just as previously discussed, the lens blur module 220 generates a feature map from the depth map of the down-sampled digital image using a convolutional neural network. Then, the lens blur module 220 generates a kernel tensor based on the depth of the down-sampled digital image, focal depth value 106, and aperture value 108, and applies the kernel tensor to the generated feature map of the down-sampled digital image. In this way, a down-sampled digital image with the depth-of-field blur effect 224 is generated.

Subsequent to this step, the procedure depicted in FIG. 8 varies from the procedure depicted in FIG. 3. In particular, up-sampling module 222 of digital effect generation system 104 up-samples, via computing device 102, the down-sampled digital image with the depth-of-field blur effect 224 and the depth map of the down-sampled digital image to correspond with digital image 204 (block 806).

Up-sampling module 222 performs up-sampling operations in a multi-step process, depicted in FIG. 9B. First, up-sampling module 222 generates, via computing device 102, first feature components from the down-sampled digital image with the depth-of-field blur effect 224 and the depth map 218 and second feature components from digital image 204. The down-sampled digital image with the depth-of-field blur effect is the output of lens blur module 220. The feature components are associated with properties of the image, such as color, texture, resolution etc. Second, up-sampling module 222 recurrently up-samples the first feature components generated from down-sampled digital image with the depth-of-field blur effect and the depth map to correspond to the second features components generated from digital image 204. It is noted that prior to the up-sampling operations, the resolution of digital image 204 is higher than that of the down-sampled digital image with the depth-of-field blur effect. After completing the up-sampling operation, the up-sampling module 222 generates the digital image with the depth-of-field blur effect 234 based on the digital image 204, the up-sampled depth map 218, and the down-sampled digital image with the depth-of-field blur effect 224 that is up-sampled (block 808). First, up-sampling module 222 first generates a first spatial weight map based on the up-sampled first feature components that correspond to the second feature components and a second spatial weight map based on the second feature components.

Then, the up-sampling module 222 weights digital image 204 with the first spatial weight map and the down-sampled digital image with the depth-of-field blur effect with the second spatial weight map. Finally, up-sampling module 222 merges the weighted digital image 204 and weighted down-sampled digital image with the depth-of-field blur effect to generate a digital image with the depth-of-field blur effect, which is based on the digital image, the down-sampled digital image with the depth-of-field blur effect that is up-sampled, and the depth map that is up-sampled. The merging results in the generation of the digital image with the depth-of-field blur effect 234. The generation of the final result—the digital image with the depth-of-field blur effect 234—by the up-sampling module 222 of digital effect generation system 104 is based on implementing the algorithm presented below:

$$H = M_A \odot A + M_L \odot \hat{L}$$

$M_A$ and $M_L$ represents the first and second spatial weight maps respectively, and the above algorithm depicts the weighting of digital image 204 (i.e. "A") with first spatial weight map $M_A$ and the down-sampled digital image with the depth of field blur effect (i.e. $\hat{L}$) with $M_L$. Thereafter, the merging of the two weighted digital images to generate the final result—digital image with the depth-of-field blur effect having a resolution that matches the digital image 204—is shown by H.

The digital image with the depth-of-field blur effect 234 is then output by display module 228 of the digital effect generation system 104 (block 810) on user interface 210 of computing device 102.

Second stage 904 of FIG. 9A depicts this final result. As depicted, the girls in the foreground appear blurred and the trees, shrubs, and part of a house in the background appears clear. Additionally, an advantage of the up-sampling module implementing the algorithm presented above over conventional digital effect generations systems is that up-sampling module 222 preserves the details and clarity of objects in certain regions within a digital images—namely object boundaries, which disproportionately contribute to the perceived quality and appearance of the depth-of-field blur effect.

Figure 10A:
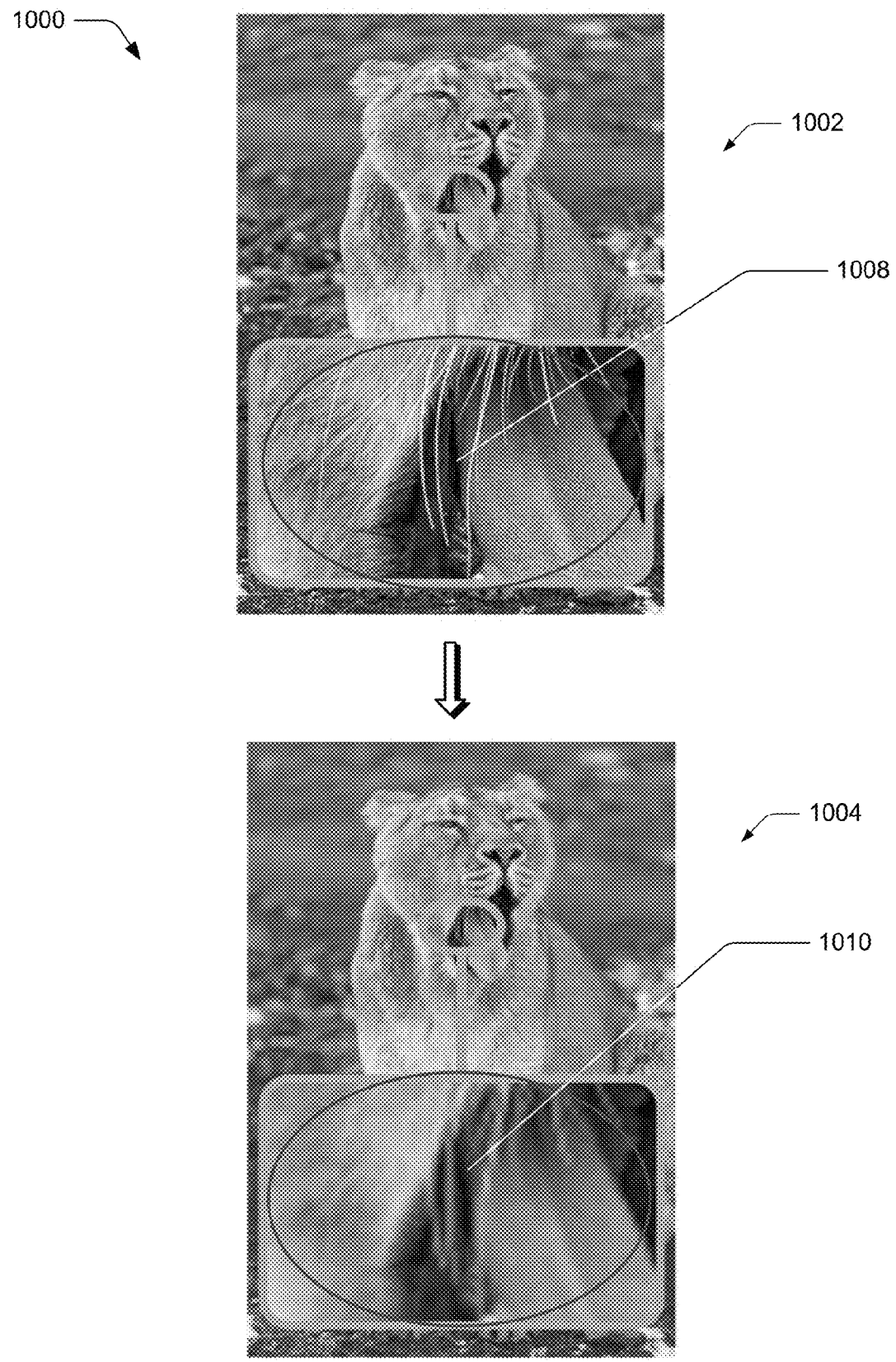
FIG. 10A depicts the deficiencies present in conventional digital effect generation systems that use conventional up-sampling processes. As depicted, the lion's whiskers are inaccurately blurred.

FIG. 10A depicts the deficiencies present in conventional digital effect generation systems. The effect of conventional systems generating digital effects with the use of conventional up-sampling techniques is described in first and second stages 1002 and 1004 in of FIG. 10A. At first stage 1002, digital image including objects that share clarity levels is shown and an area near the boundary of an object—yawning lion with a field in the background—is zoomed in to show a clear depiction of the lion's whiskers 1008. The green grass in the background shares the clarity level of the lion's whiskers 1008. Second stage 1004 shows conventional digital effect generation systems applying a blur effect to the digital image with the use of conventional up-sampling techniques. The result, as depicted, shows that the use of conventional up-sampling techniques by conventional digital effect generation systems inaccurately blurs the lion's whiskers in 1010.

Figure 10B:
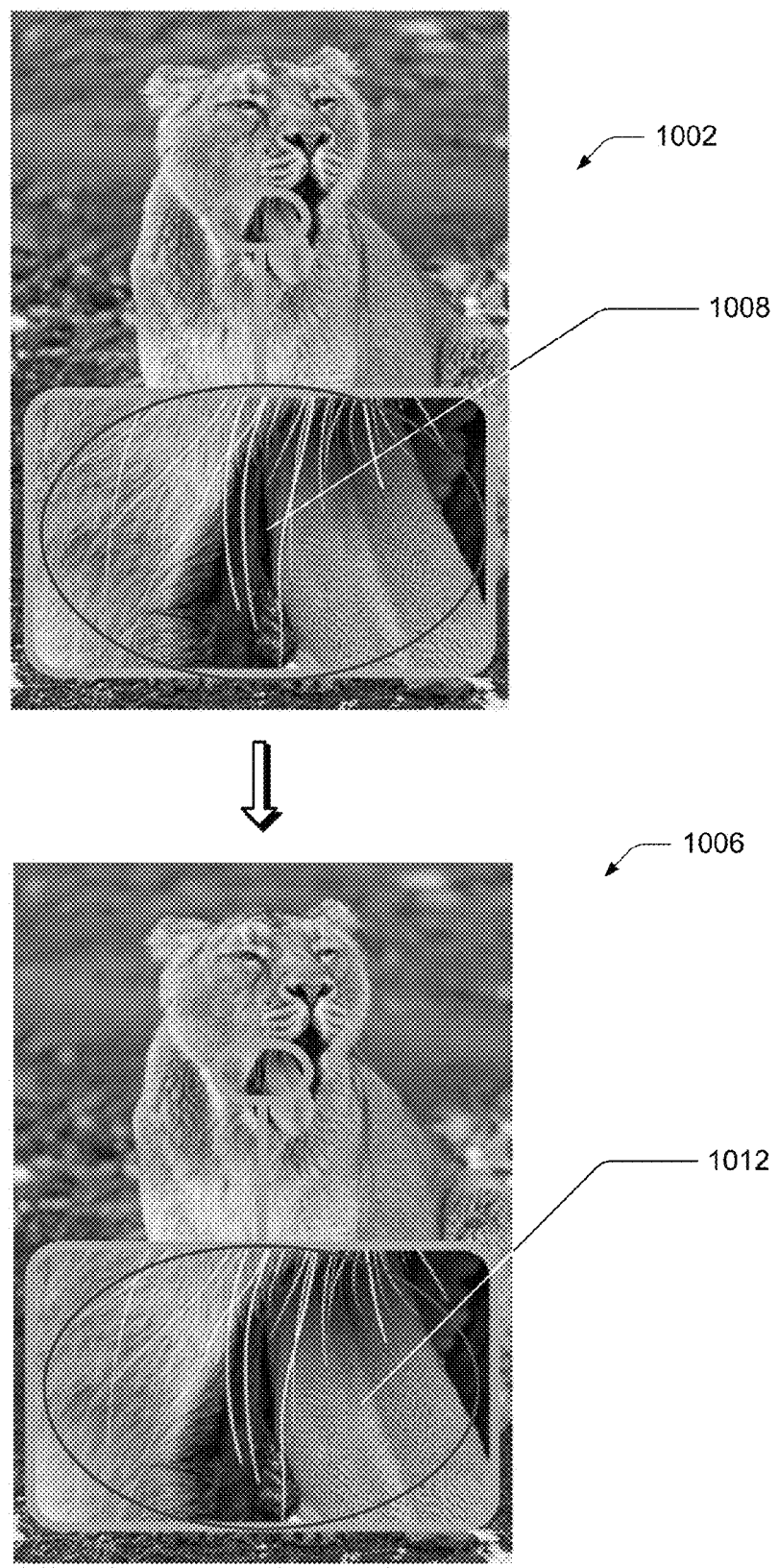
FIG. 10B depicts the digital effect generation system described herein overcoming the deficiencies present in conventional digital effect generation systems.

FIG. 10B depicts an example operation of digital effect generation system 104 utilizing up-sampling module 222 to generate a depth-of-field blur effect on a digital image with accuracy in the regions that are not blurred (i.e. the in-focus regions). In FIG. 10B, first stage 1002 digital image with objects that share clarity levels is shown again in a zoomed in view of the yawning lion with a field in the background. However, in contrast with conventional up-sampling techniques implemented by conventional systems, up-sampling module 222 of digital effect generation system 104 generates a blur effect on the digital image such that the lion's whiskers 1012 are clear, while the background is accurately blurred. In this way, up-sampling module 222 of digital effect generation system 104 overcomes the deficiencies of conventional systems, namely the inability of conventional systems to preserve details in the areas within the digital image that are not blurred (i.e. the in-focus or clear areas of the image).

Figure 11:
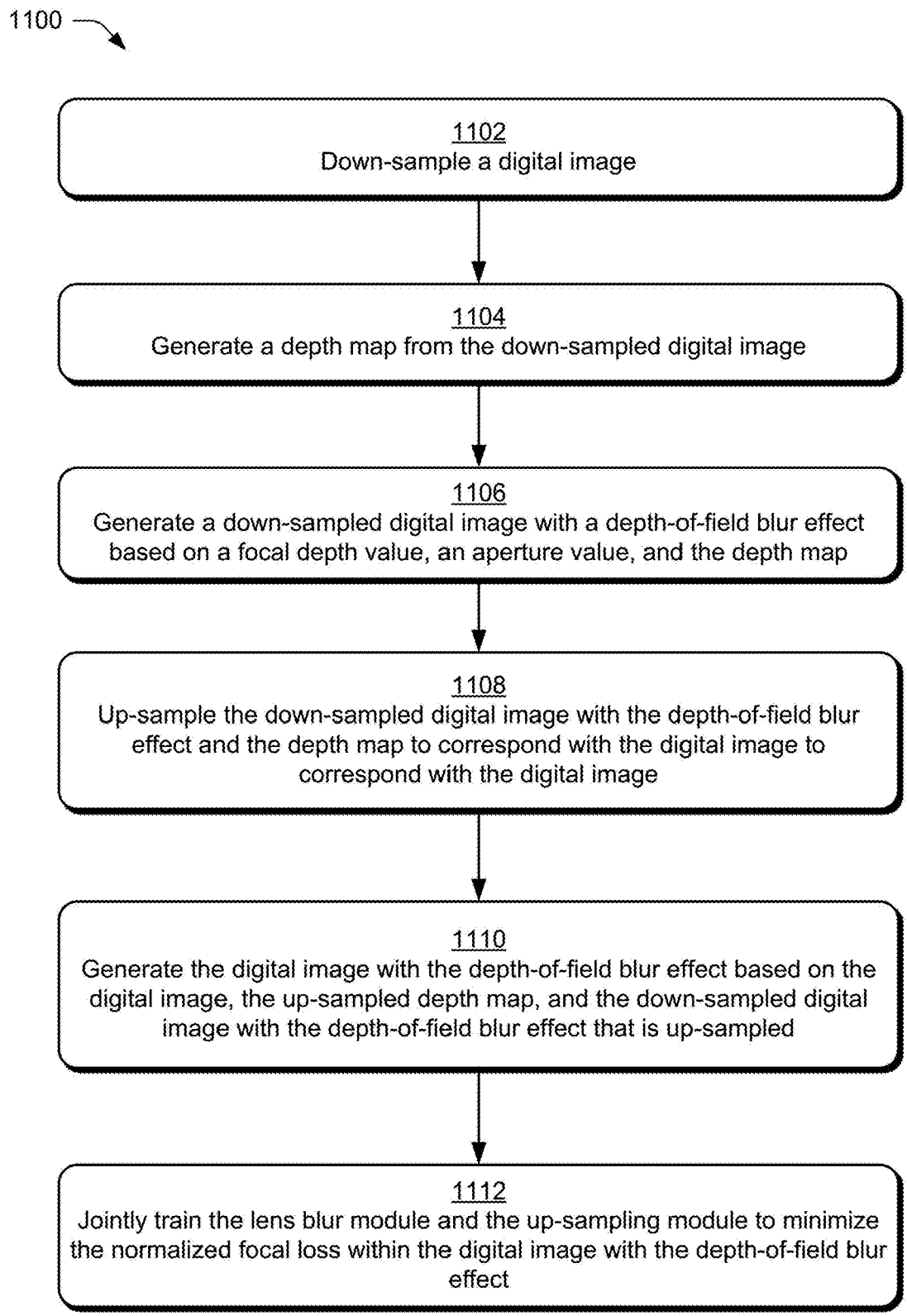
FIG. 11 is a flow diagram depicting an example procedure to generate digital effects such as depth-of-field blur effects using the digital effect generation system described herein on a digital image with accuracy and efficiency.

Digital Effect Generation System Configured to Minimize the Normalized Focal Loss at Regions in the Digital Image with Depth Discontinuities FIG. 11 depicts procedure 1100 in another example operation of digital effect generation system 104. In contrast with the procedures described in FIGS. 3 and 8, the procedure depicted in FIG. 11 includes the additional step of jointly training lens blur module 220 and up-sampling module 222 in order to minimize the focal loss within digital images, especially at objects boundaries within digital images that contain depth discontinuities. The objects boundaries that contain depth discontinuities contribute disproportionately to the focal loss of the image. Prior to discussing the procedural steps listed in FIG. 11, a discussion of FIG. 12A is instructive.

Figure 12A:
FIG. 12A depicts the deficiencies of conventional loss functions implemented by conventional digital effect generations systems.
Figure 12B:
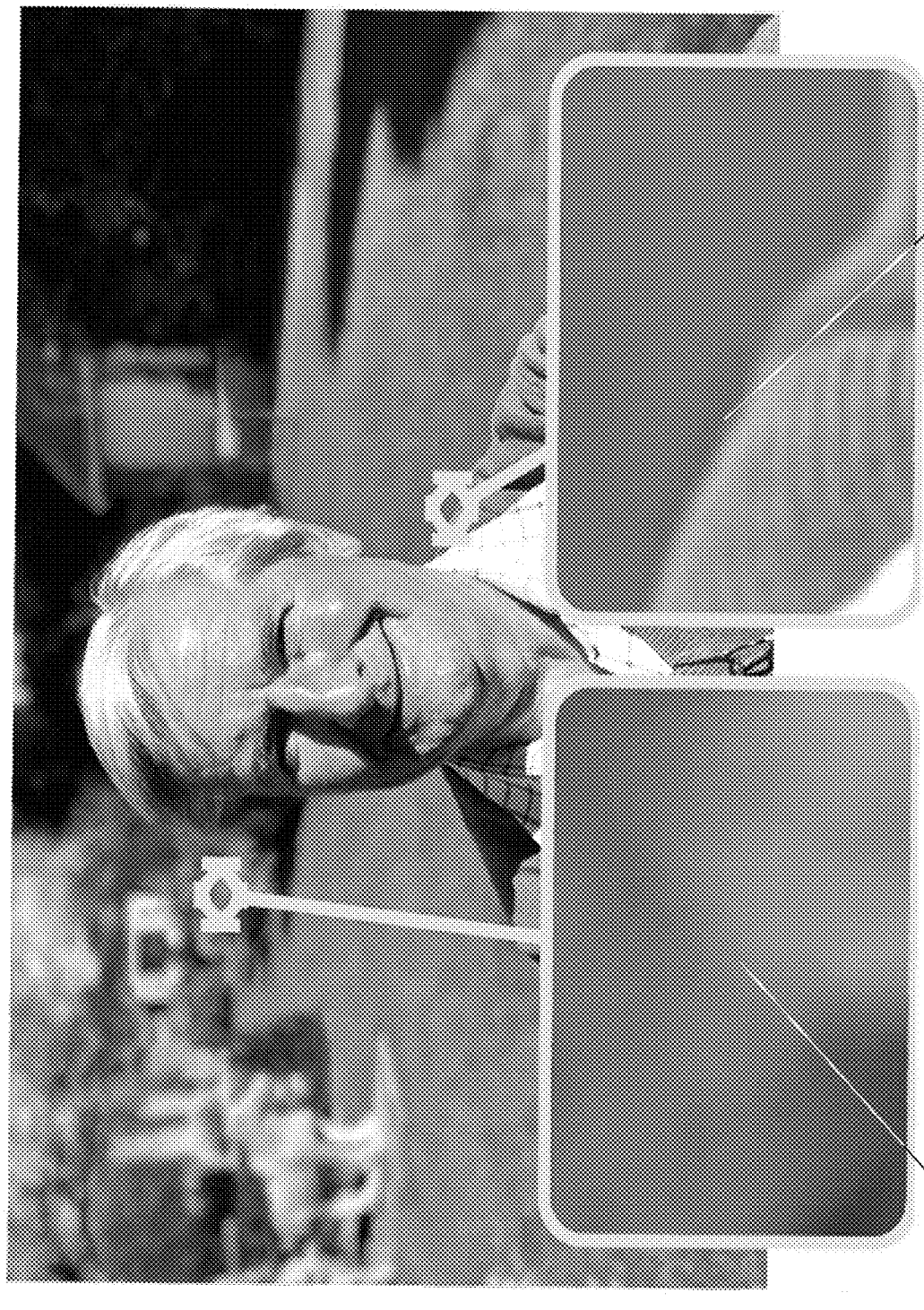
FIG. 12B depicts the joint training module of the digital effect generation system overcoming the deficiencies of conventional digital effect generations systems implementing conventional loss functions by using a loss function that effectively minimizes the normalized focal loss at object boundaries with depth discontinuities.

FIG. 12A depicts the deficiencies present in conventional digital effect generation systems that implement other focal loss functions. FIG. 12A depicts an individual in the foreground with clarity and applies a blur effect on the background of the digital image. However, when certain regions 1202 in the blurred areas are zoomed in, the loss functions implemented by conventional systems fail to adequately minimize focal loss. In effect, certain areas are unevenly or inaccurately blurred. Moreover, the object boundary depicted in FIG. 12A—the border around the individual's sweater—does not appear to have been smoothly blurred. These deficiencies are due to the inaccuracies of conventional loss functions FIG. 12B depicts digital effect generation system 104 jointly training lens blur module 220 and up-sampling module 222 using a unique focal loss function to effectively minimize the normalized focal loss at both the object boundaries with depth discontinuities and the certain regions present in the blurred areas. These object boundaries with depth discontinuities present in the blurred areas contribute significantly to quality of the depth-of-field blur effects generated on digital images.

To begin, down-sampling module 212 down-samples digital image 204 (block 1102) and depth map generation module 216 generates a depth from the down-sampled digital image 214 (block 1104). Thereafter, similar to the procedure steps recited in FIGS. 3 and 8, lens blur module 220 generates a down-sampled digital image with a depth-of-field blur effect 224 based on the focal depth value, the aperture value, and the depth map (block 1106). In effect, the blur effect is generated on a portion of the down-sampled digital image such that this portion appears blurred, while another portion of the down-sampled digital image appears clear. The portion that appears clear corresponds to the focal depth value, while the blurred portion corresponds to another focal depth value, upon which the depth-of-field blurred effect appears.

From this, the up-sampling module 222 up-samples the down-sampled digital image with the depth-of-field blur effect and the depth map of the down-sampled digital image to correspond with the digital image 204 (the original digital image) (block 1108). Then, the up-sampling module 222 generates a digital image with the depth-of-field blur effect based on digital image 204, the depth map that is up-sampled, and the down-sampled digital image with the depth-of-field blur effect that is up-sampled to correspond with digital image 204 (block 1110).

Despite performing the above steps, there is some amount of focal loss that contributes to the overall inaccuracy with which depth-of-field blur effects is applied to digital images. Thus, joint training module 226 of digital effect generation system 104 performs an additional step of jointly training lens blur module 220 and up-sampling module 222 using a unique focal loss function to minimize the normalized focal loss within the digital image with the depth-of-field blur effect 232 (block 1112). The joint training module effectively minimizes the focal loss, including at objects boundaries with depth-discontinuities—areas that that contribute disproportionately to the inaccuracy of the depth-of-field blur effect and to the perceived quality of the digital image. A representation of the focal loss algorithm implemented by digital effect generation system 104 that is presented below as:

$$J_f\langle X \mid \theta \rangle = \frac{\sum_i w_i L(X_i - Y_i)}{\sum_i w_i}$$

The variables of X and Y represent an prediction value and the ground truth respectively. The variable i represents a spatial index value and θ represents network parameters to be optimized. L represent some amount of pixel-wise loss and variable $w_i$ represents a loss weight amount or loss weight at spatial index location i that is computing according to a local error function represented by $(\|X_i - Y_i\|_1)^\alpha$. The hyper parameter a is empirically set to a constant value. An advantage of the unique focal loss function represented above is unlike conventional loss functions, this loss function more effectively addresses pixels defining areas within the digital image that contain large errors, e.g. objects with depth discontinuities.

Figure 13:
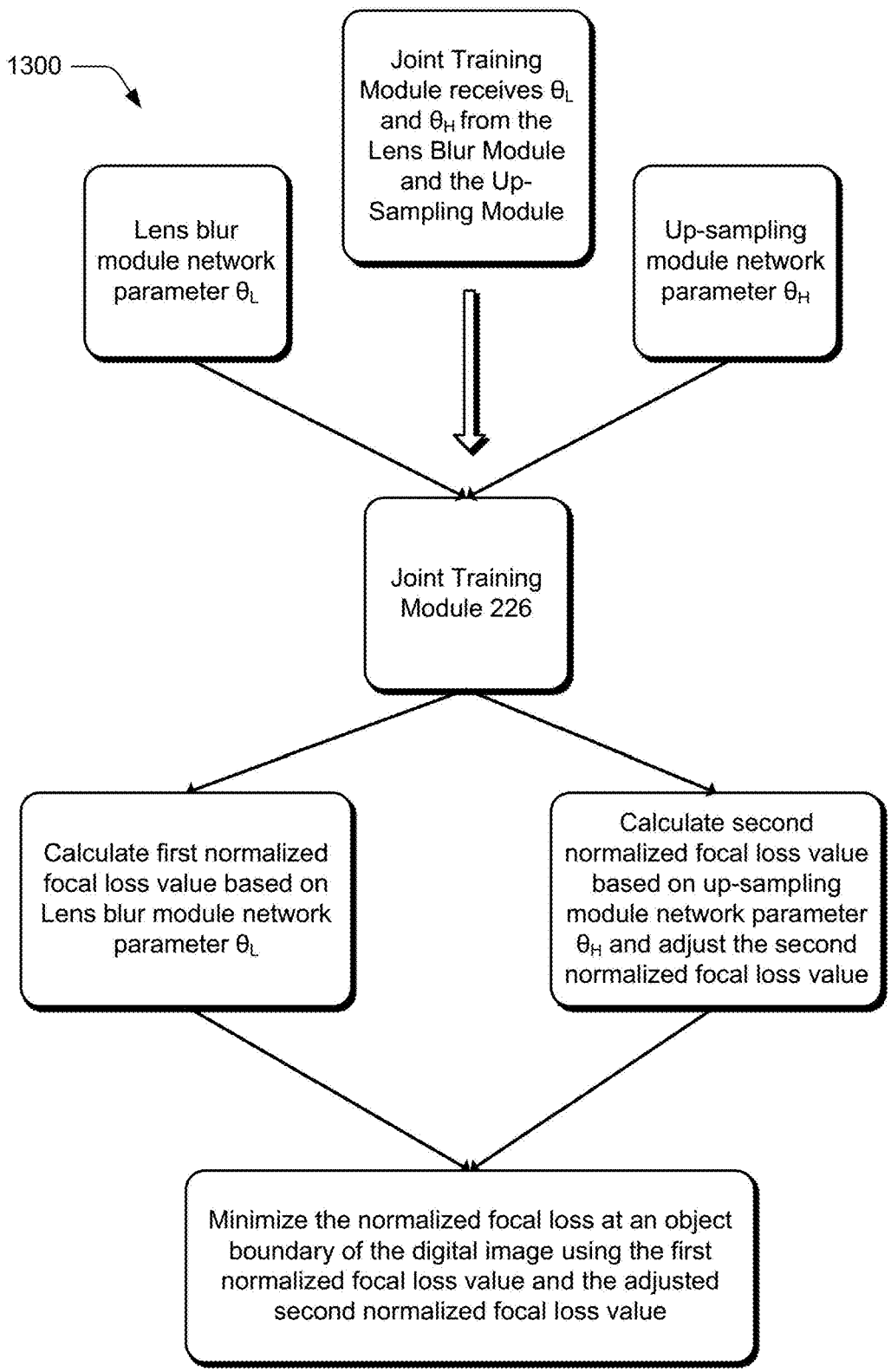
FIG. 13 depicts the joint training module of the digital effect generation system configured to jointly train the lens blur module and the up-sampling module to minimize the focal loss at objects boundaries within the digital image with the depth-of-field blur effect.

The implementation of the above focal loss algorithm by joint training module 226 jointly by both lens blur module 220 and up-sampling module 222 is described below and depicted in FIG. 13. As depicted in FIG. 13, joint training module 226 receives the lens blur module network parameter $\theta_l$ and an up-sampling module network parameter $\theta_h$. Then, joint training module 226 calculates a first normalized focal loss value based on lens blur network parameter $\theta_l$ and a second normalized focal loss value based on the up-sampling module network parameter $\theta_h$ and combines the two calculated normalized focal loss values to minimize the focal loss. The algorithm that is implemented to achieve this result is represented as:

$$\operatorname*{argmin}_{\theta_l, \theta_u} J_f\langle L \mid \theta_l \rangle + \beta X J_f\langle H \mid \theta_h \rangle$$

The first normalized focal loss value calculation is depicted by $J_f\langle L|\theta_l\rangle$ and the second normalized focal loss value calculation is depicted by $J_f\langle H|\theta_h\rangle$. Additionally, β represents an adjustment value that alters calculated second normalized focal loss value. Thereafter, joint training module 226 completes the implementation of the unique focal loss algorithm by summing the first normalized focal loss value depicted by $J_f\langle L|\theta_l\rangle$ with the second focal loss value that is altered by adjustment value β.

An expanded version of the implementation of focal loss function using the lens blur module network parameter $\theta_l$ is represented by:

$$J_f(\langle L \mid \theta_l \rangle) = \frac{\sum_i |w_i(L_i - A_i)|^{\alpha+1}}{\sum_i |w_i(L_i - A_i)|^\alpha}$$

Similarly, an expanded version of the implementation of focal loss function using the lens blur module network parameter $\theta_h$ is represented by:

$$J_f(\langle H \mid \theta_h \rangle) = \frac{\sum_i |w_i(H_i - A_i)|^{\alpha+1}}{\sum_i |w_i(H_i - A_i)|^\alpha}$$

Having calculated the first normalized focal loss value based on $\theta_l$ and the second normalized focal loss value based on $\theta_h$, joint training module 226 minimizes the normalized focal loss in the digital image with the depth-of-field blur effect—the final result—by adjusting the second normalized focal loss value by an adjustment factor (i.e. β), and summing the first normalized focal loss value with the adjusted second normalized focal loss value. In this way, joint training module 226 of digital effect generation system 104 implements the unique focal loss normalization algorithm described herein.

Consequently, as depicted in FIG. 12B, digital effect generation system 104 minimizes normalized focal loss throughout the digital image, including at both the object boundaries with depth discontinuities—challenging areas of the image that disproportionately contribute to a reduction in the perceived image quality and blur effect inaccuracy. In this way, the digital effect generation system 104 overcomes the limitations of conventional focal loss minimization functions and facilitates the generation of depth-of-field blur effects that appear accurately and are applied effectively to the portions intended by the content creator.

Example System and Device

Figure 14:
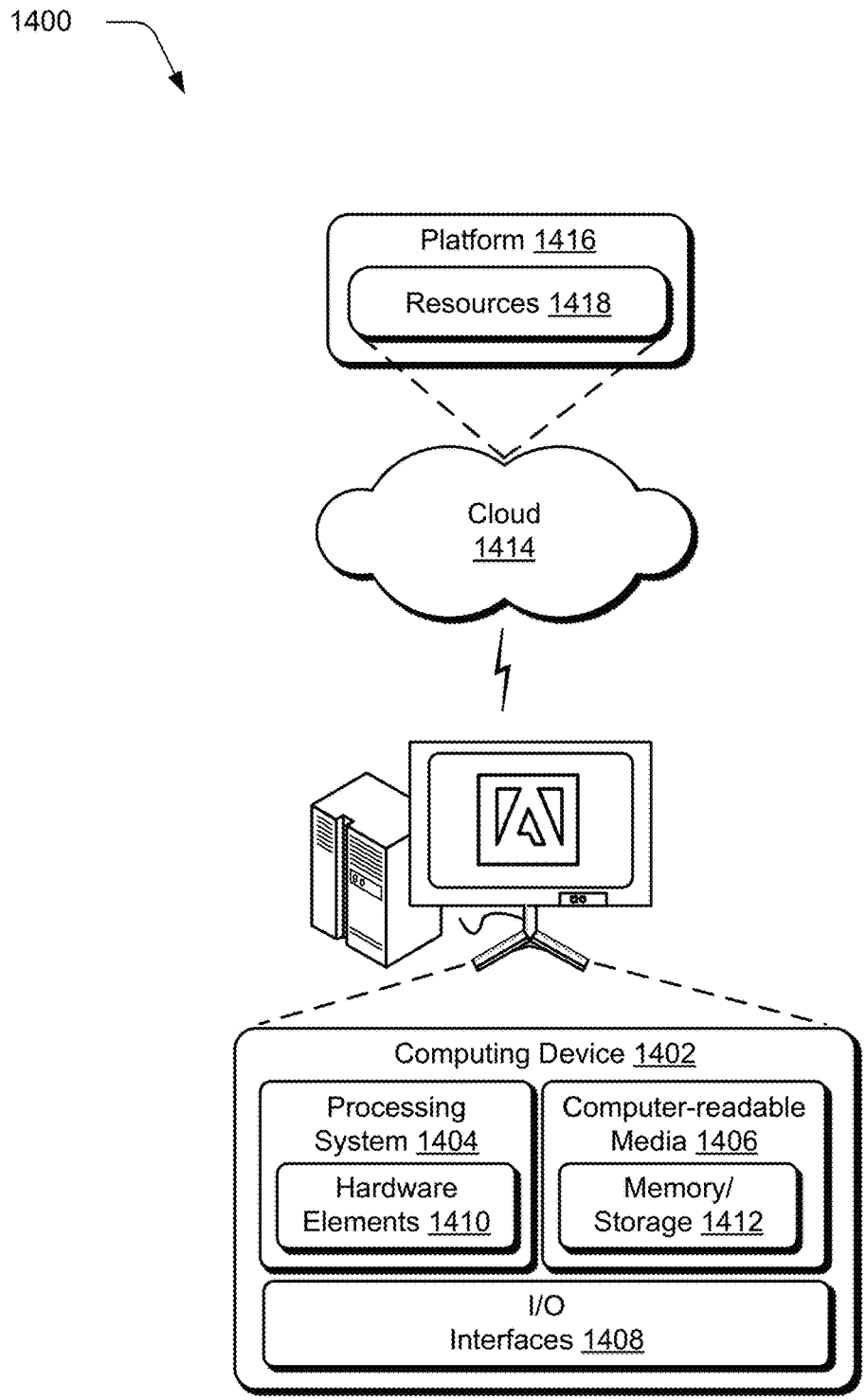
FIG. 14 illustrates an example system including various components of an example device that can be implemented at any time by the computing device as described and/or utilized with references to FIGS. 1-9C to implement examples of the techniques described herein.

FIG. 14 illustrates an example system generally at 1400 that includes an example computing device 1402 that is representative of one or more computing systems and/or devices that may implement the various techniques described herein. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 102 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network. The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

The invention claimed is:

1. In a digital image generating environment, a method implemented by a computing device to generate a digital image with a depth-of-field blur effect, the method comprising:
receiving, by the computing device, user inputs specifying a focal depth value that defines a depth plane within the digital image and an aperture value describing an intensity of the depth-of-field blur effect;
generating, by the computing device, a down-sampled digital image from the digital image;
generating, by the computing device, a depth map from the down-sampled digital image; and
generating, by the computing device, a down-sampled digital image with the depth-of-field blur effect based on the focal depth value, the aperture value, and the depth map.

2. The method as described in claim 1, wherein the generating of the down-sampled digital image with the depth-of-field blur effect comprises:
generating, by the computing device, a feature map from the depth map of the down-sampled digital image using a convolutional neural network;
generating, by the computing device, a kernel tensor using the focal depth value, the aperture value, and the depth map; and
applying, by the computing device, the kernel tensor to the feature map of the down-sampled digital image.

3. The method as described in claim 1, wherein the depth-of-field blur effect is not generated on a first portion of the down-sampled digital image that corresponds to the focal depth value, and is generated on a second portion of the down-sampled digital image that does not correspond to the focal depth value.

4. The method as described in claim 1, further comprising:
receiving, by the computing device, additional user inputs specifying a second focal depth value and a second aperture value;
generating, by the computing device, the down-sampled digital image with a second depth-of-field blur effect based on the second focal depth value, the second aperture value, and the depth map, in which:
the second depth-of-field blur effect is not generated on a third portion of the down-sampled digital image that corresponds to the second focal depth value; and
the second depth-of-field blur effect is generated on a fourth portion of the down-sampled digital image that does not correspond to the second focal depth value.

5. The method as described in claim 4, wherein specifying the second aperture value comprises at least one of increasing the first aperture value or decreasing the first aperture value.

6. The method as described in claim 5, wherein increasing of the aperture value increases the intensity of the depth-of-field blur effect, and decreasing the aperture value decreases the intensity of the depth-of-field blur effect.

7. The method as described in claim 4, wherein generating the down-sampled digital image with the second depth-of-field blur effect comprises:
generating, by the computing device, a feature map from the depth map of the down-sampled digital image using a convolutional neural network;
generating, by the computing device, a kernel tensor using the second focal depth value, the second aperture value, and the depth map; and
applying, by the computing device, the kernel tensor using the second focal depth value, the second aperture value, and the depth map to the feature map of the down-sampled digital image.

8. In a digital image generating environment, a method to generate a digital image with a depth-of-field blur effect, the method comprising:
generating, by the computing device, a depth map from a down-sampled digital image generated from the digital image;
generating, by the computing device, a down-sampled digital image with the depth-of-field blur effect based on a focal depth value, an aperture value, and the depth map;
up-sampling, by the computing device, the down-sampled digital image with the depth-of-field blur effect and the depth map to correspond with the digital image;
generating, by the computing device, the digital image with the depth-of-field blur effect based on the digital image, the up-sampled depth map, and the down-sampled digital image with the depth-of-field blur effect that is up-sampled; and
outputting, by the computing device, the digital image with the depth-of-field blur effect.

9. The method as described in claim 8, generating the down-sampled digital image with the depth-of-field blur effect comprises:
generating, by the computing device, a feature map from the depth map of the down-sampled digital image using a convolutional neural network;
generating, by the computing device, a kernel tensor using the focal depth value, the aperture value, and the depth map; and
applying, by the computing device, the kernel tensor to the feature map of the down-sampled digital image.

10. The method as described in claim 9, wherein the convolutional neural network generates the feature map by concatenating one or more intermediate feature maps, each of the one or more intermediate feature maps defining one or more properties of the down-sampled digital image.

11. The method as described in claim 8, wherein up-sampling the down-sampled digital image with the depth-of-field blur effect and the depth map to correspond with the digital image comprises:
generating, by the computing device, first feature components from the down-sampled digital image with the depth-of-field blur effect and the depth map;
generating, by the computing device, second features components from the digital image;

recurrently up-sampling, by the computing device, the first feature components to correspond to the second feature components; and generating, by the computing device, a first spatial weight map based on the up-sampled first feature components and a second spatial weight map based on the second feature components.

12. The method as described in claim 11, wherein generating the digital image with the depth-of-field blur effect comprises:

weighting, by the computing device, the digital image with the first spatial weight map;

weighting, by the computing device, the down-sampled digital image with the depth-of-field blur effect with the second spatial weight map; and merging, by the computing device, the weighted digital image with the weighted down-sampled digital image with the depth-of-field blur effect.

13. In a digital image generating environment, a system to minimize normalized focal loss within a digital image with a depth-of-field blur effect, the system comprising:

a down-sampling module implemented at least partially in hardware of a computing device to down-sample the digital image;

a depth map generation module implemented at least partially in hardware of a computing device to generate a depth map from the down-sampled digital image;

a lens blur module implemented at least partially in hardware of the computing device to generate a down-sampled digital image with a depth-of-field blur effect based on a focal depth value, an aperture value, and the depth map;

an up-sampling module implemented at least partially in hardware of the computing device to:
  up-sample the down-sampled digital image with the depth-of-field blur effect and the depth map to correspond with the digital image, and
  generate the digital image with the depth-of-field blur effect based on the digital image, the depth map that is up-sampled, and the down-sampled digital image with the depth-of-field blur effect that is up-sampled; and a joint training module implemented at least partially in hardware of a computing device to jointly train the lens blur module and the up-sampling module to minimize the normalized focal loss within the digital image with the depth-of-field blur effect.

14. The system as described in claim 13, further comprising:

an image reception module implemented at least partially in hardware of a computing device to receive the digital image;

a parameter module implemented at least partially in hardware of a computing device to receive user inputs specifying the focal depth value that defines a depth plane within the digital image and the aperture value that describes an intensity of the depth-of-field blur effect; and a display module implemented at least partially in hardware of a computing device to display the digital image with the depth-of-field blur effect with normalized focal loss that is minimized.

15. The system as described in claim 13, wherein the lens blur module generates the down-sampled digital image with the depth-of-field blur effect by:

generating, by the computing device, a feature map from the depth map of the down-sampled digital image using a convolutional neural network;

generating, by the computing device, a kernel tensor using the focal depth value, the aperture value, and the depth map; and applying, by the computing device, the kernel tensor to the feature map of the down-sampled digital image.

16. The system a described in claim 15, wherein the convolutional neural network generates the feature map by concatenating one or more intermediate feature maps, each of the one or more intermediate feature maps defining one or more properties of the down-sampled digital image.

17. The system as described in claim 13, wherein the up-sampling module up-samples the down-sampled digital image with the depth-of-field blur effect, and the depth map to correspond with the digital image by:

generating first feature components from the down-sampled digital image with the depth-of-field blur effect and the depth map;

generating second features components from the digital image;

recurrently up-sampling, by the computing device, the first feature components to correspond to the second feature components; and generating, by the computing device, a first spatial weight map based on the up-sampled first feature components and a second spatial weight map based on the second feature components.

18. The system as described in claim 17, wherein the up-sampling module generates the digital image with the depth-of-field blur effect by:

weighting, by the computing device, the digital image with the first spatial weight map;

weighting, by the computing device, the down-sampled digital image with the depth-of-field blur effect with the second spatial weight map; and merging, by the computing device, the weighted digital image with the weighted down-sampled digital image with the depth-of-field blur effect.

19. The system as described in claim 13, wherein the joint training module is implemented to jointly train the lens blur module and the up-sampling module to minimize the normalized focal loss in the digital image with the depth-of-field blur effect by:

receiving a lens blur module network parameter and an up-sampling module network parameter; and calculating a first normalized focal loss value based on the lens blur module network parameter and a second normalized focal loss value based on the up-sampling module network parameter.

20. The system as described in claim 19, further comprising:

adjusting the second normalized focal loss value according to an adjustment factor; and summing the first normalized focal loss value based on the lens blur module network parameter with the adjusted second focal loss value based on the up-sampling module network parameter.

* * * * *